US012741658B2

(12) United States Patent
Hara

(10) Patent No.: US 12,741,658 B2
(45) Date of Patent: Sep. 22, 2026

(54) VEHICLE CONTROL SYSTEM

(71) Applicant: TOYOTA JIDOSHA KABUSHIKI KAISHA, Toyota (JP)

(72) Inventor: Yoshikazu Hara, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/957,686

(22) Filed: Nov. 23, 2024

(65) Prior Publication Data

US 2025/0178622 A1 Jun. 5, 2025

(30) Foreign Application Priority Data

Dec. 4, 2023 (JP) ................................ 2023-204547

(51) Int. Cl.

*B60W 50/08* (2020.01)
*B60W 10/02* (2006.01)
*B60W 10/08* (2006.01)

(52) U.S. Cl.

CPC ............ *B60W 50/08* (2013.01); *B60W 10/02* (2013.01); *B60W 10/08* (2013.01); *B60W 2520/10* (2013.01)

(58) Field of Classification Search

CPC ...... B60W 50/08; B60W 10/02; B60W 10/08; B60W 2520/10; B60W 2040/0827; B60W 2540/14; B60W 2540/229; B60W 40/08; B60W 2540/10; B60W 2540/22; B60N 2/0023; B60N 2/976; B60N 2/0268; B60N 2/0278; B60L 15/20; B60R 16/0232; B60R 16/037; A61B 5/4519

See application file for complete search history.

(56) References Cited

U.S. PATENT DOCUMENTS

| | | | | |
|---|---|---|---|---|
| 9,090,256 | B2 * | 7/2015 | Takahashi | B60W 10/02 |
| 10,710,594 | B2 | 7/2020 | Zhao et al. | |
| 2009/0048737 | A1 * | 2/2009 | Nakagoshi | B60W 40/08 701/44 |
| 2010/0130808 | A1 | 5/2010 | Hattori | |
| 2011/0125362 | A1 * | 5/2011 | Matsunaga | B60W 40/08 701/31.4 |
| 2017/0028163 | A1 * | 2/2017 | Onuma | A61M 21/00 |
| 2021/0188322 | A1 * | 6/2021 | Yoshida | A61B 5/00 |
| 2021/0229550 | A1 | 7/2021 | Isami | |

(Continued)

FOREIGN PATENT DOCUMENTS

| | | | |
|---|---|---|---|
| DE | 10 2016 215 250 | A1 | 2/2018 |
| EP | 2 557 012 | B1 | 3/2020 |

(Continued)

*Primary Examiner* — Abby J Flynn

*Assistant Examiner* — Matthew John Moscola

(74) *Attorney, Agent, or Firm* — Finnegan, Henderson, Farabow, Garrett and Dunner, LLP

(57) ABSTRACT

A vehicle control system that controls a vehicle includes a single or plurality of processors, and the single or plurality of processors is configured to acquire a physical fatigue degree of a driver of the vehicle, using a sensor that is equipped in the vehicle. The single or plurality of processors is configured to actuate a massage apparatus when an actuation condition is satisfied, the massage apparatus being installed at a driver's seat of the vehicle, the actuation condition including at least a condition that the physical fatigue degree exceeds a first threshold.

13 Claims, 19 Drawing Sheets

(56) References Cited

U.S. PATENT DOCUMENTS

| | | | | |
|---|---|---|---|---|
| 2022/0041062 | A1* | 2/2022 | Nishimine | B60H 1/249 |
| 2022/0041063 | A1 | 2/2022 | Isami et al. | |
| 2022/0041067 | A1* | 2/2022 | Isami | B60L 15/20 |
| 2022/0063677 | A1* | 3/2022 | Sekine | B60W 40/08 |

FOREIGN PATENT DOCUMENTS

| | | | |
|---|---|---|---|
| JP | 3694467 | B2 | 9/2005 |
| JP | 2008-142411 | A | 6/2008 |
| JP | 2009-195595 | A | 9/2009 |
| JP | 2009-291245 | A | 12/2009 |
| JP | 2010-023629 | A | 2/2010 |
| JP | 2017-030445 | A | 2/2017 |
| JP | 2020-156260 | A | 9/2020 |
| JP | 6787507 | B1 | 11/2020 |
| JP | 2022-030814 | A | 2/2022 |
| JP | 2022-030816 | A | 2/2022 |
| WO | WO 2007/123127 | A1 | 1/2007 |
| WO | WO 2010/007505 | A1 | 1/2010 |

* cited by examiner

110
FATIGUE DEGREE ACQUISITION UNIT
111
MUSCLE HARDNESS ACQUISITION UNIT
120
ACTUATION CONDITION DETERMINATION UNIT
121
FATIGUE DEGREE DETERMINATION UNIT
122
DRIVER INTENTION CONFIRMATION UNIT
90
HMI
140
END CONDITION DETERMINATION UNIT
130
MASSAGE APPARATUS CONTROL UNIT

THREE-PEDAL MODE

110
FATIGUE DEGREE ACQUISITION UNIT
112
CLUTCH OPERATION DEGREE ACQUISITION UNIT
120
ACTUATION CONDITION DETERMINATION UNIT
121
FATIGUE DEGREE DETERMINATION UNIT
123
VEHICLE SPEED DETERMINATION UNIT
122
DRIVER INTENTION CONFIRMATION UNIT
90
HMI
140
END CONDITION DETERMINATION UNIT
130
MASSAGE APPARATUS CONTROL UNIT

<DRIVING MODE>

THREE-PEDAL MODE
(CLUTCH OPERATION IS NECESSARY)

TWO-PEDAL MODE
(CLUTCH OPERATION IS NOT NECESSARY)

SEQUENTIAL SHIFT MODE

AT MODE

EV MODE

MODE SWITCHING UNIT
160
MODE SWITCHING CONDITION DETERMINATION UNIT
150
FATIGUE DEGREE DETERMINATION UNIT
151
DRIVER INTENTION CONFIRMATION UNIT
152
HMI
90
FATIGUE DEGREE ACQUISITION UNIT
110
MUSCLE HARDNESS ACQUISITION UNIT
111
CLUTCH OPERATION DEGREE ACQUISITION UNIT
112

110
FATIGUE DEGREE ACQUISITION UNIT
111
MUSCLE HARDNESS ACQUISITION UNIT
112
CLUTCH OPERATION DEGREE ACQUISITION UNIT
120
ACTUATION CONDITION DETERMINATION UNIT
140
END CONDITION DETERMINATION UNIT
150
MODE SWITCHING CONDITION DETERMINATION UNIT
130
MASSAGE APPARATUS CONTROL UNIT
160
MODE SWITCHING UNIT

VEHICLE CONTROL SYSTEM

CROSS-REFERENCE TO RELATED APPLICATION

This application claims priority to Japanese Patent Application No. 2023-204547 filed on Dec. 4, 2023, incorporated herein by reference in its entirety.

BACKGROUND

1. Technical Field

The present disclosure relates to a technology for controlling a vehicle.

2. Description of Related Art

Japanese Patent No. 6787507 discloses a battery electric vehicle that can reproduce the manual gear shifting behavior of a manual transmission vehicle (MT vehicle) in a pseudo manner.

SUMMARY

Physical fatigue in a vehicle driver is undesirable from a standpoint of appropriate driving. A technology that allows the driver to drive the vehicle more comfortably is desired.

A vehicle control system according to a first aspect of the present disclosure is a vehicle control system that controls a vehicle, and the vehicle control system includes a single or plurality of processors.

The single or plurality of processors acquires a physical fatigue degree of a driver of the vehicle, using a sensor that is equipped in the vehicle.

The single or plurality of processors actuate a massage apparatus when an actuation condition is satisfied, the massage apparatus being installed at a driver's seat of the vehicle, the actuation condition including at least a condition that the physical fatigue degree exceeds a first threshold.

In the vehicle control system according to the first aspect of the present disclosure, the actuation condition may further include a condition that the driver permits the actuation of the massage apparatus.

In the vehicle control system according to the first aspect of the present disclosure, the actuation condition may further include a condition that the speed of the vehicle is lower than a predetermined speed.

In the vehicle control system according to the first aspect of the present disclosure, the sensor may include a muscle hardness meter that is installed at the driver's seat, and the single or plurality of processors may be configured to acquire the physical fatigue degree, based on the muscle hardness of the driver that is detected by the muscle hardness meter.

In the vehicle control system according to the first aspect of the present disclosure, the vehicle may be a manual transmission vehicle that includes a clutch pedal.

In the vehicle control system according to the first aspect of the present disclosure, the sensor may include a clutch position sensor that detects operation of the clutch pedal, and the single or plurality of processors may be configured to acquire the physical fatigue degree, based on at least one of the number of times of the operation of the clutch pedal in a certain time and an operation time of the clutch pedal in the certain time.

In the vehicle control system according to the first aspect of the present disclosure, the vehicle may be a battery electric vehicle configured to use an electric motor as a dynamic power device for traveling, and includes a pseudo clutch pedal and a pseudo shift device, the pseudo clutch pedal may be operated at a time of operation of the pseudo shift device, a driving mode of the battery electric vehicle may include a three-pedal mode in which the output of the electric motor with respect to operation of an accelerator pedal is changed depending on the operation of the pseudo clutch pedal and the operation of the pseudo shift device, and in the three-pedal mode, the single or plurality of processors may be configured to acquire the physical fatigue degree, and to actuate the massage apparatus when the actuation condition is satisfied.

In the vehicle control system according to the first aspect of the present disclosure, the sensor may include a clutch position sensor configured to detect the operation of the pseudo clutch pedal, and the single or plurality of processors may be configured to acquire the physical fatigue degree, based on at least one of the number of times of the operation of the pseudo clutch pedal in a certain time and an operation time of the pseudo clutch pedal in the certain time.

In the vehicle control system according to the first aspect of the present disclosure, the massage apparatus may include a bearing-surface massage apparatus that is embedded in a bearing-surface seat of the driver's seat.

In the vehicle control system according to the first aspect of the present disclosure, the driving mode of the battery electric vehicle may further include a two-pedal mode in which the operation of the pseudo clutch pedal is not necessary, and the single or plurality of processors may be further configured to switch the driving mode from the three-pedal mode to the two-pedal mode, when a mode switching condition is satisfied, the mode switching condition including at least a condition that the physical fatigue degree exceeds a second threshold during the three-pedal mode.

In the vehicle control system according to the first aspect of the present disclosure, the mode switching condition may further include a condition that the driver permits the switching from the three-pedal mode to the two-pedal mode.

In the vehicle control system according to the first aspect of the present disclosure, the single or plurality of processors may be configured to determine whether the mode switching condition is satisfied, after the actuation condition is satisfied and the massage apparatus is actuated.

A vehicle control system according to a second aspect of the present disclosure is a vehicle control system that controls a battery electric vehicle that uses an electric motor as a dynamic power device for traveling, and the vehicle control system includes a single or plurality of processors.

The battery electric vehicle includes a pseudo clutch pedal and a pseudo shift device. The pseudo clutch pedal is operated at a time of operation of the pseudo shift device.

A driving mode of the battery electric vehicle includes a three-pedal mode in which the output of the electric motor with respect to operation of an accelerator pedal is changed depending on the operation of the pseudo clutch pedal and the operation of the pseudo shift device, and a two-pedal mode in which the operation of the pseudo clutch pedal is not necessary.

The single or plurality of processors acquires a physical fatigue degree of a driver of the battery electric vehicle, using a sensor that is equipped in the battery electric vehicle.

The single or plurality of processors switches the driving mode from the three-pedal mode to the two-pedal mode, when a mode switching condition is satisfied, the mode switching condition including at least a condition that the physical fatigue degree exceeds a threshold during the three-pedal mode.

In the vehicle control system according to the second aspect of the present disclosure, the mode switching condition may further include a condition that the driver permits the switching from the three-pedal mode to the two-pedal mode.

In the vehicle control system according to the second aspect of the present disclosure, the sensor may include a clutch position sensor configured to detect the operation of the pseudo clutch pedal, and the single or plurality of processors may be configured to acquire the physical fatigue degree, based on at least one of the number of times of the operation of the pseudo clutch pedal in a certain time and an operation time of the pseudo clutch pedal in the certain time.

In the vehicle control system according to the first aspect, when the actuation condition including at least the condition that the physical fatigue degree of the driver exceeds the threshold is satisfied, the massage apparatus installed at the driver's seat is actuated. Thereby, the physical fatigue of the driver is alleviated. As a result, the driver can more comfortably drive the vehicle.

In the vehicle control system according to the second aspect, the battery electric vehicle includes the pseudo clutch pedal and the pseudo shift device, and the driving mode includes the three-pedal mode in which the manual gear shifting behavior of the manual transmission vehicle is reproduced in a pseudo manner. When the mode switching condition including at least the condition that the physical fatigue degree of the driver exceeds the threshold during the three-pedal mode is satisfied, the driving mode of the battery electric vehicle is switched from the three-pedal mode in which the operation of the pseudo clutch pedal is necessary to the two-pedal mode in which the operation of the pseudo clutch pedal is not necessary. Thereby, the driver is freed from the operation of the pseudo clutch pedal, and therefore, the physical fatigue of the driver is alleviated. As a result, the driver can more comfortably drive the vehicle.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. First Embodiment

1-1. Outline

Figure 1:
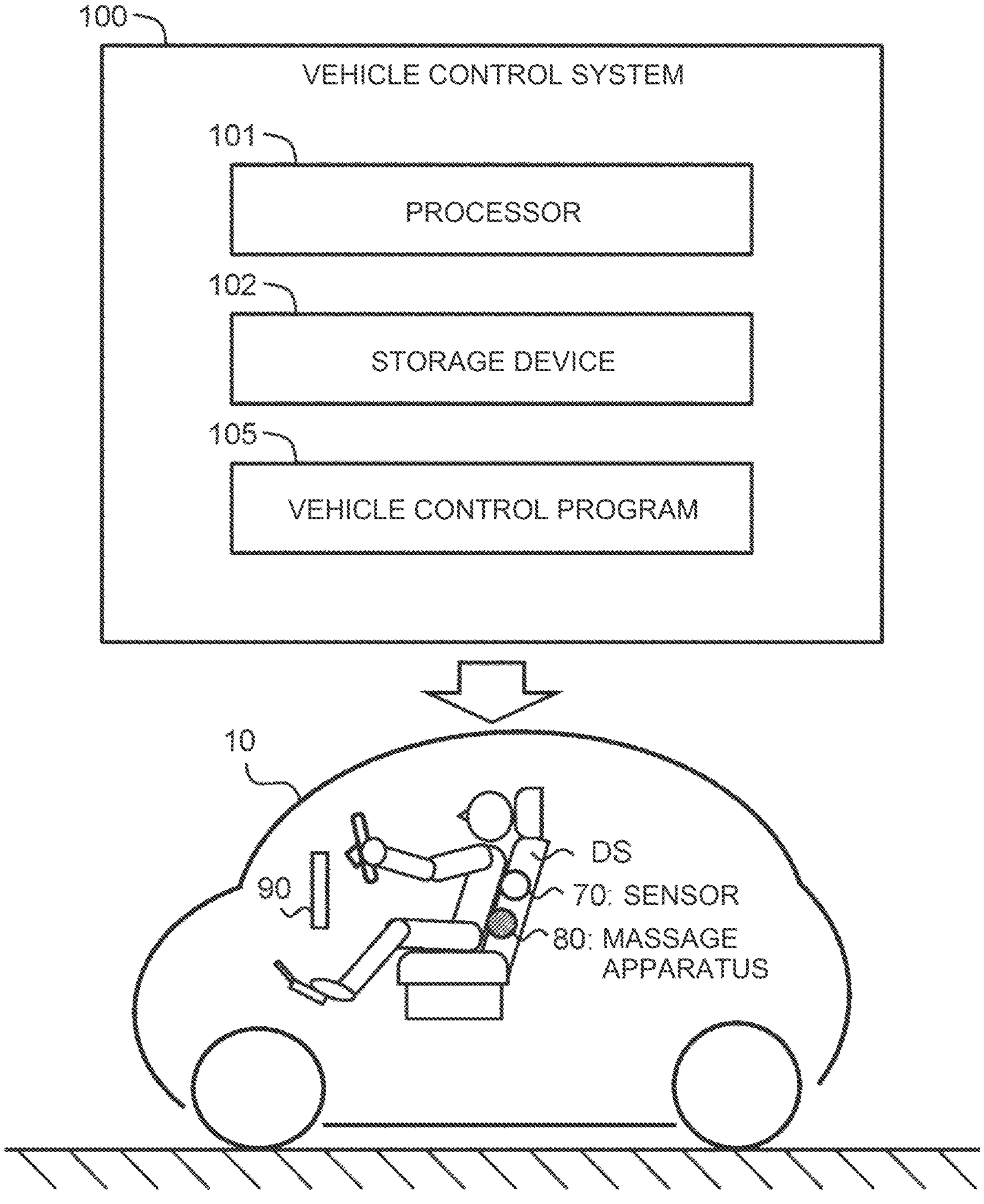
FIG. 1 is a conceptual diagram showing a vehicle and a vehicle control system.

FIG. 1 is a conceptual diagram showing a vehicle 10 and a vehicle control system 100 according to an embodiment. The vehicle 10 may be an engine vehicle in which an internal combustion engine is used as a dynamic power device for traveling, or may be a battery electric vehicle in which an electric motor is used as a dynamic power device for traveling. The vehicle 10 may be a manual transmission vehicle (MT vehicle).

The vehicle control system 100 controls the vehicle 10. The whole of the vehicle control system 100 may be equipped in the vehicle 10. As another example, at least a part of the vehicle control system 100 may be included in a management server that can communicate with the vehicle 10. That is, the vehicle control system 100 may remotely control the vehicle 10. The vehicle control system 100 may be distributed between the vehicle 10 and the management server.

In general, the vehicle control system 100 includes a single or plurality of processors 101 (referred to as merely a processor 101, hereinafter) and a single or plurality of storage devices 102 (referred to as merely a storage device 102, hereinafter). The processor 101 executes various processes. Examples of the processor 101 include a general-purpose processor, a specific-use processor, a central processing unit (CPU), a graphics processing unit (GPU), an application specific integrated circuit (ASIC), a field-programmable gate array (FPGA), an integrated circuit, a conventional circuit, and/or combinations of them. The processor 101 can be also referred to as a circuitry or a processing circuitry. The circuitry is hardware that has a program for realizing written functions, or is hardware that executes functions. The storage device 102 stores (contains) a variety of information. Examples of the storage device 102 include a volatile memory, a non-volatile memory, a hard disk drive (HDD), and a solid state drive (SSD). Functions of the vehicle control system 100 are realized by the cooperation between the processor 101 and the storage device 102.

A single or plurality of vehicle control programs 105 (referred to as merely a vehicle control program 105, hereinafter) is a computer program that is executed by the processor 101. Functions of the vehicle control system 100 may be realized by the cooperation between the processor 101 that executes the vehicle control program 105 and the storage device 102. The vehicle control program 105 is contained in the storage device 102. Alternatively, the vehicle control program 105 may be recorded in a computer-readable recording medium.

A driver of the vehicle 10 sometimes has a feeling of physical fatigue. For example, when the driver drives the vehicle 10 for a long time, the shoulders and waist of the driver can get stiff. Aa another example, in the case where the vehicle 10 is an MT vehicle, the operation of a clutch pedal can cause the fatigue of the left leg of the driver. The physical fatigue of the driver is undesirable from a standpoint of appropriate driving. A technology that allows the driver to drive the vehicle 10 more comfortably is desired.

Hence, in the embodiment, a sensor 70 for detecting the physical fatigue of the driver is equipped in the vehicle 10. Furthermore, a massage apparatus 80 for alleviating the physical fatigue of the driver is equipped in the vehicle 10. Particularly, the massage apparatus 80 is installed at a driver's seat DS on which the driver sits.

The vehicle control system 100 (processor 101) acquires a physical fatigue degree P of the driver, using the sensor 70 that is equipped in the vehicle 10. The physical fatigue degree P quantitatively shows the degree of the physical fatigue of the driver. An actuation condition for actuating the massage apparatus 80 includes at least a condition that the physical fatigue degree P of the driver exceeds a first threshold Pth1. The vehicle control system 100 (processor 101) determines whether the actuation condition is satisfied, based on at least the physical fatigue degree P. In the case where the actuation condition is satisfied, the vehicle control system 100 (processor 101) actuates the massage apparatus 80 that is installed at the driver's seat DS of the vehicle 10. Thereby, the physical fatigue of the driver is alleviated. As a result, the driver can more comfortably drive the vehicle 10.

The vehicle 10 may be a battery electric vehicle that uses an electric motor as a dynamic power device for traveling. The vibration in the cabin of the battery electric vehicle is originally small, and therefore, the vibration of the massage apparatus 80 more effectively acts on the driver.

1-2. Examples of Sensor and Massage Apparatus

Figure 2:
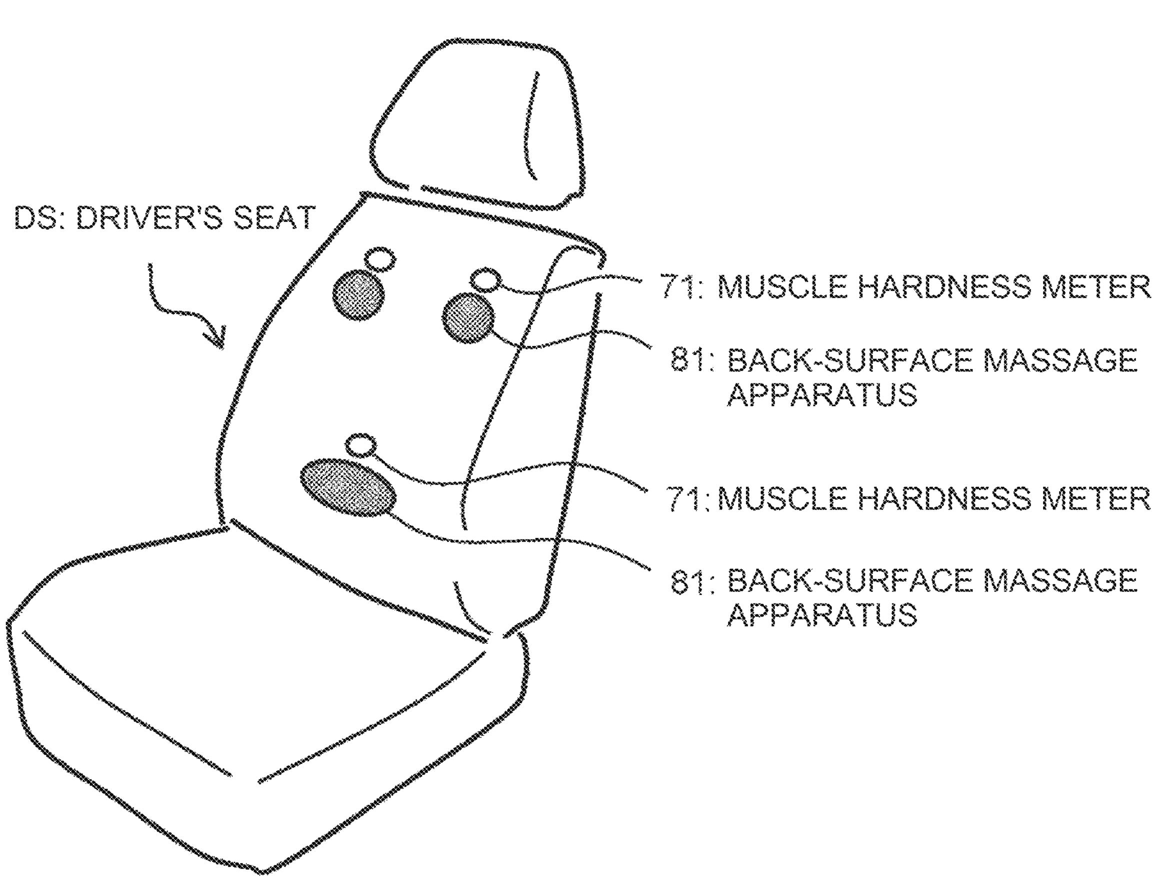
FIG. 2 is a diagram showing an exemplary sensor and an exemplary massage apparatus.

FIG. 2 is a diagram showing examples of the sensor 70 and the massage apparatus 80. The sensor 70 includes one or more muscle hardness meters 71 that detect the muscle hardness of the driver. Typically, the muscle hardness meter 71 is installed at a back-surface seat of the driver's seat DS. In the example shown in FIG. 2, the muscle hardness meter 71 is installed at each of positions where the shoulders and waist of the driver touch. The massage apparatus 80 includes a back-surface massage apparatus 81 that is embedded in the back-surface seat of the driver's seat DS. For example, the back-surface massage apparatus 81 is a roller. In the example shown in FIG. 2, the back-surface massage apparatus 81 is embedded at each of positions where the shoulders and waist of the driver touch.

The vehicle control system 100 acquires the physical fatigue degree P based on the muscle hardness of the driver that is detected by the muscle hardness meter 71. In this case, as the muscle hardness that is detected by the muscle hardness meter 71 is higher, the physical fatigue degree P is higher. The muscle hardness that is detected by the muscle hardness meter 71 may be used as the physical fatigue degree P with no change. Physical fatigue degrees P of the shoulders and the waist may be separately acquired using the respective muscle hardness meters 71 at the positions where the shoulders and waist of the driver touch.

In the case where the actuation condition including at least the condition that the physical fatigue degree P exceeds the first threshold Pth1 is satisfied, the vehicle control system 100 actuates the back-surface massage apparatus 81. In the case where the respective physical fatigue degrees P of the shoulders and the waist are separately calculated, the vehicle control system 100 may independently actuate the back-surface massage apparatuses 81 at the positions where the shoulders touch and the back-surface massage apparatus 81 at the position where the waist touches. By the actuation of the back-surface massage apparatuses 81, the stiff of the shoulders and waist of the drivers is alleviated. As a result, the driver can more comfortably drive the vehicle 10.

1-3. Exemplary Functional Configuration and Exemplary Process

Figure 3:
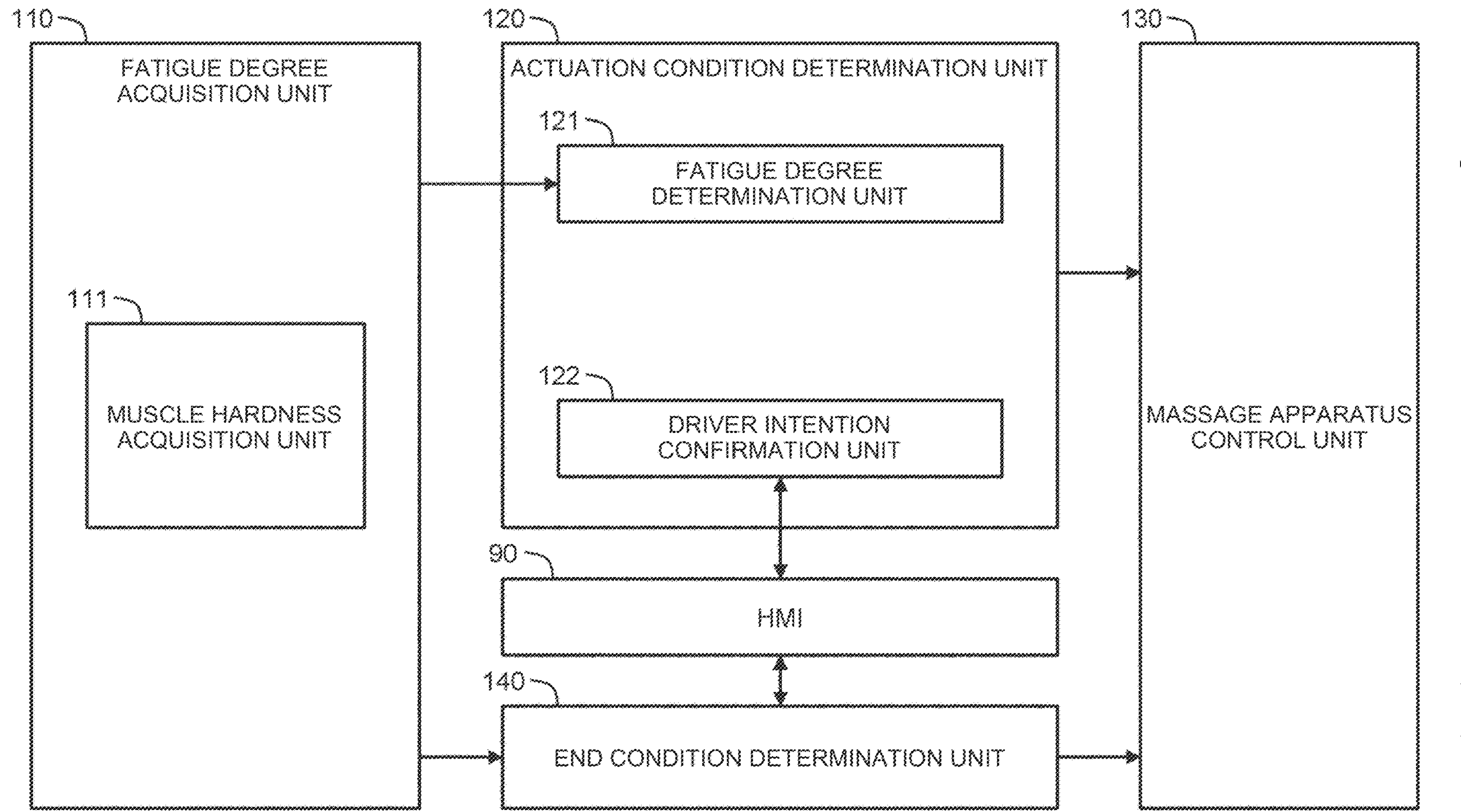
FIG. 3 is a block diagram showing an exemplary functional configuration of the vehicle control system according to a first embodiment.

FIG. 3 is a block diagram showing an exemplary functional configuration of a vehicle control system 100 according to a first embodiment. The vehicle control system 100 includes a fatigue degree acquisition unit 110, an actuation condition determination unit 120, a massage apparatus control unit 130, and an end condition determination unit 140, as functional blocks. The functional blocks may be realized by the cooperation between the processor 101 that executes the vehicle control program 105 and the storage device 102. Some of the functional blocks may be included in the management server that can communicate with the vehicle 10.

Figure 4:
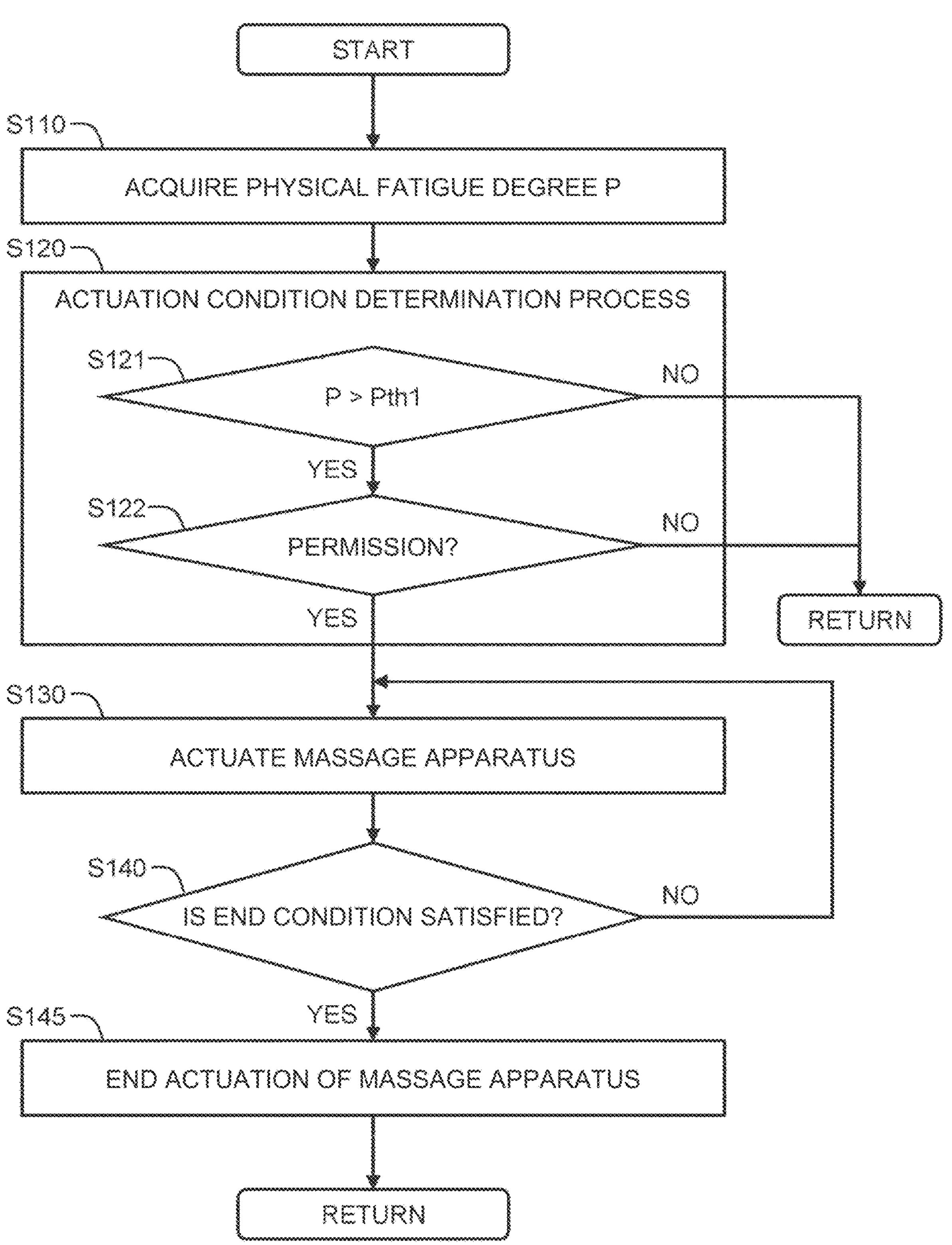
FIG. 4 is a flowchart showing an exemplary process by the vehicle control system according to the first embodiment.

FIG. 4 is a flowchart showing an exemplary process by the vehicle control system 100 according to the first embodiment. With reference to FIG. 3 and FIG. 4, the exemplary process by the vehicle control system 100 will be described below.

In step S110, the fatigue degree acquisition unit 110 acquires sensor detection information indicating the detection result of the sensor 70 that is equipped in the vehicle 10. In the case where the fatigue degree acquisition unit 110 is included in the management server, the fatigue degree acquisition unit 110 communicates with the vehicle 10, and acquires the sensor detection information. The fatigue degree acquisition unit 110 acquires the physical fatigue degree P of the driver, based on the sensor detection information.

For example, the fatigue degree acquisition unit 110 includes a muscle hardness acquisition unit 111. The muscle hardness acquisition unit 111 acquires the muscle hardness of the driver that is detected by the muscle hardness meter 71 (see FIG. 2) installed at the driver's seat DS. The muscle hardness of the driver corresponds to the sensor detection information. Moreover, the fatigue degree acquisition unit 110 acquires the physical fatigue degree P based on the muscle hardness of the driver. In this case, as the muscle hardness of the driver is higher, the physical fatigue degree P is higher. The muscle hardness of the driver may be used as the physical fatigue degree P with no change.

In step S120, the actuation condition determination unit 120 determines whether a predetermined actuation condition is satisfied. In the case where the predetermined actuation condition is not satisfied (step S120; No), the process in this cycle ends. On the other hand, in the case where the predetermined actuation condition is satisfied (step S120; Yes), the process proceeds to step S130.

In the example shown in FIG. 3 and FIG. 4, the predetermined actuation condition includes a first condition and a second condition. The first condition is that the physical fatigue degree P exceeds the first threshold Pth1. The second condition is that the driver permits the actuation of the massage apparatus 80. The actuation condition determination unit 120 includes a fatigue degree determination unit 121 and a driver intention confirmation unit 122, for determining whether the first condition and the second condition are satisfied, respectively. At least one of the fatigue degree determination unit 121 and the driver intention confirmation unit 122 may be included in the management server that can communicate with the vehicle 10.

In step S121, the fatigue degree determination unit 121 determines whether the physical fatigue degree P is higher than the first threshold Pth1, that is, whether the first condition is satisfied. In the case where the first condition is not satisfied (step S121; No), the actuation condition is not satisfied. On the other hand, in the case where the first condition is satisfied (step S121; Yes), the process proceeds to step S122.

In step S122, the driver intention confirmation unit 122 determines whether the driver has permitted the actuation of the massage apparatus 80, that is, whether the second condition is satisfied. More specifically, the vehicle 10 is equipped with a human-machine interface (HMI) 90 (see FIG. 1). The HMI 90 includes an output device and an input device. Examples of the output device include a touch panel, a display, and a speaker. Examples of the input device include a touch panel and a button. The driver intention confirmation unit 122 inquires of the driver whether to agree to the actuation of the massage apparatus 80, through the output device of the HMI 90. An inquiry message may be displayed on the display, may be given from the speaker, or may be output from both the display and the speaker. In response to the inquiry message, the driver inputs "permission" or "rejection", using the input device of the HMI 90. The driver intention confirmation unit 122 can determine whether the second condition is satisfied, based on the input from the driver. In the case where the second condition is not satisfied (step S122; No), the actuation condition is not satisfied. On the other hand, in the case where the second condition is satisfied (step S122; Yes), the actuation condition is satisfied (step S120; Yes), and the process proceeds to step S130.

In step S130, the massage apparatus control unit 130 actuates the massage apparatus 80 that is installed at the driver's seat DS of the vehicle 10. When the actuation of the massage apparatus 80 is started, the massage apparatus control unit 130 may notify the driver that massage is started, through the output device of the HMI 90. During the actuation of the massage apparatus 80, the massage apparatus control unit 130 may output sound from the speaker of the HMI 90, for avoiding the driver from feeling sleepy.

In step S140, the end condition determination unit 140 determines whether an end condition is satisfied. For example, the end condition is that the physical fatigue degree P of the driver becomes equal to or lower than the first threshold Pth1. As another example, the end condition may be that a certain time elapses from the start of the actuation of the massage apparatus 80. Furthermore, as another example, the end condition may be that the driver gives an instruction to stop the massage apparatus 80 through the HMI 90. In the case where the end condition is not satisfied (step S140; No), the process returns to step S130, and the actuation of the massage apparatus 80 is continued. On the other hand, in the case where the end condition is satisfied (step S140; Yes), the process proceeds to step S145.

In step S145, the massage apparatus control unit 130 ends the actuation of the massage apparatus 80.

1-4. Modification

Figure 5:
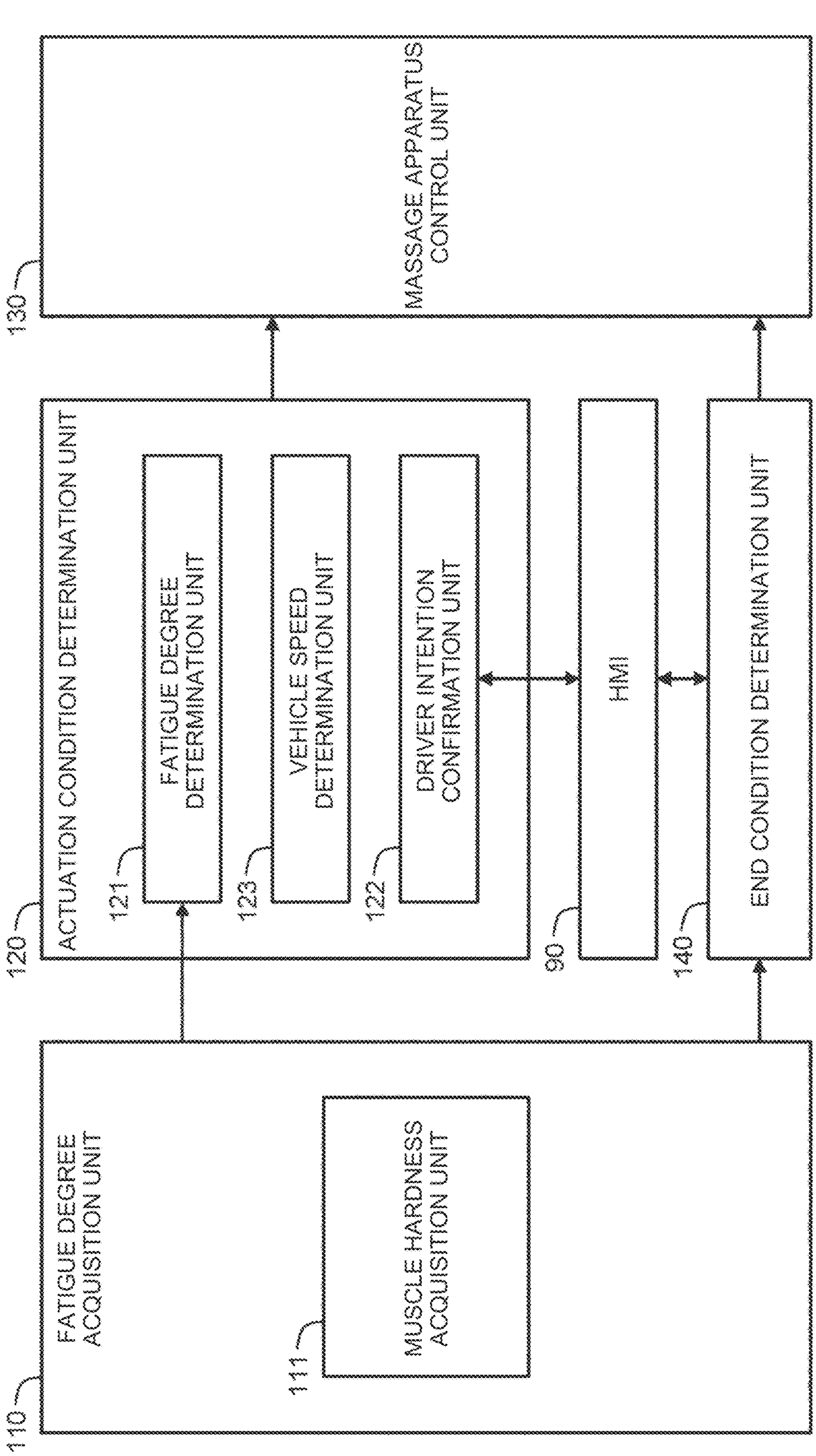
FIG. 5 is a block diagram showing an exemplary functional configuration of a vehicle control system according to a modification of the first embodiment.
Figure 6:
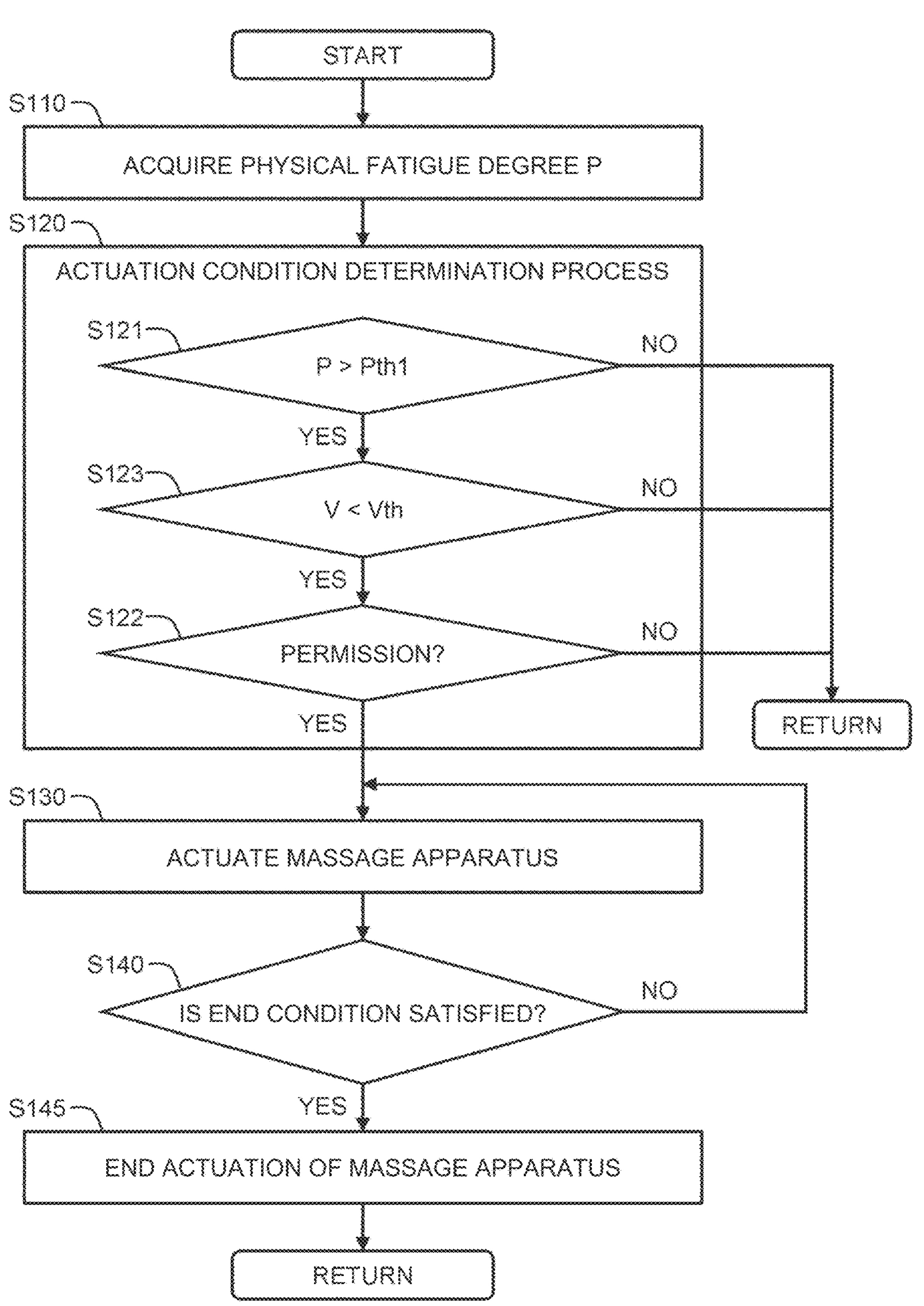
FIG. 6 is a flowchart showing an exemplary process by the vehicle control system according to the modification of the first embodiment.

FIG. 5 is a block diagram showing an exemplary functional configuration of a vehicle control system 100 according to a modification. FIG. 6 is a flowchart showing an exemplary process by the vehicle control system 100 according to the modification. The same descriptions as those in the above example shown in FIG. 3 and FIG. 4 are omitted when appropriate.

In the modification, the predetermined actuation condition further includes a third condition, in addition to the above first condition and the above second condition. The third condition is that the speed of the vehicle 10 is lower than a predetermined speed Vth. The actuation condition determination unit 120 includes a vehicle speed determination unit 123, in addition to the above fatigue degree determination unit 121 and the above driver intention confirmation unit 122. Step S120 includes step S123, in addition to the above step S121 and the above step S122. In step S123, the vehicle speed determination unit 123 acquires information about the speed of the vehicle 10. For example, the speed of the vehicle 10 is calculated based on a wheel speed that is detected by a wheel speed sensor equipped in the vehicle 10. Moreover, the vehicle speed determination unit 123 determines whether the speed of the vehicle 10 is lower than the predetermined speed Vth, that is, whether the third condition is satisfied. In the case where the third condition is not satisfied (step S123; No), the actuation condition is not satisfied. On the other hand, in the case where the third condition is satisfied (step S123; Yes), the process proceeds to step S122.

In the modification, the end condition may be that the speed of the vehicle 10 becomes equal to or higher than the predetermined speed Vth.

In the modification, the predetermined actuation condition includes the condition that the speed of the vehicle 10 is lower than the predetermined speed Vth. In the case where the speed of the vehicle 10 is equal to or higher than the predetermined speed Vth, the actuation of the massage apparatus 80 is not started, and therefore, the driver can focus on the driving operation. Meanwhile, as a use way, the driver can receive massage at the time of congestion.

As another modification, the predetermined actuation condition may exclude the second condition. In that case, step S122 is skipped.

2. Second Embodiment

2-1. Outline

In the case where the operation of the clutch pedal is necessary, the fatigue of the left leg of the driver can be caused. The fatigue of the left leg due to the operation of the clutch pedal is a kind of the physical fatigue of the driver. A second embodiment proposes a technology that makes it possible to alleviate the fatigue of the left leg due to the operation of the clutch pedal.

For example, a vehicle 10 assumed in the second embodiment is a manual transmission vehicle (MT vehicle) that includes the clutch pedal. As another example, the vehicle 10 may be a battery electric vehicle that can reproduce the manual gear shifting behavior of the MT vehicle in a pseudo manner (see Japanese Patent No. 6787507). A case where the vehicle 10 is a battery electric vehicle that can reproduce the manual gear shifting behavior of the MT vehicle in a pseudo manner will be discussed below. The same goes for a case where the vehicle 10 is an ordinary MT vehicle.

Figure 7:
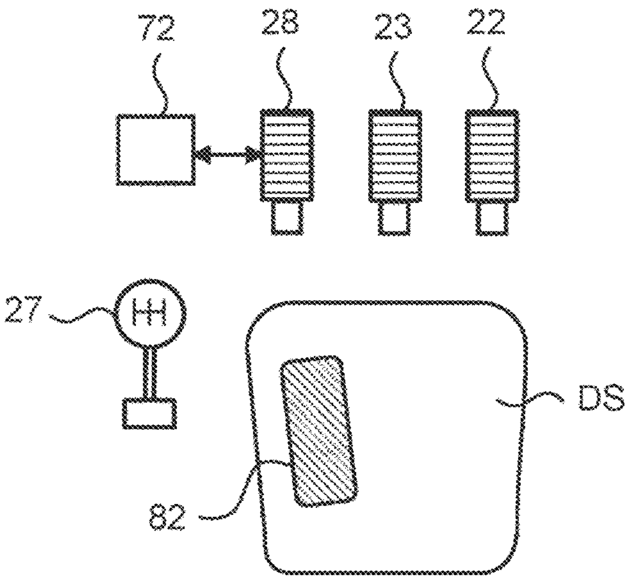
FIG. 7 is a conceptual diagram for describing an outline of a second embodiment.
Figure 7:
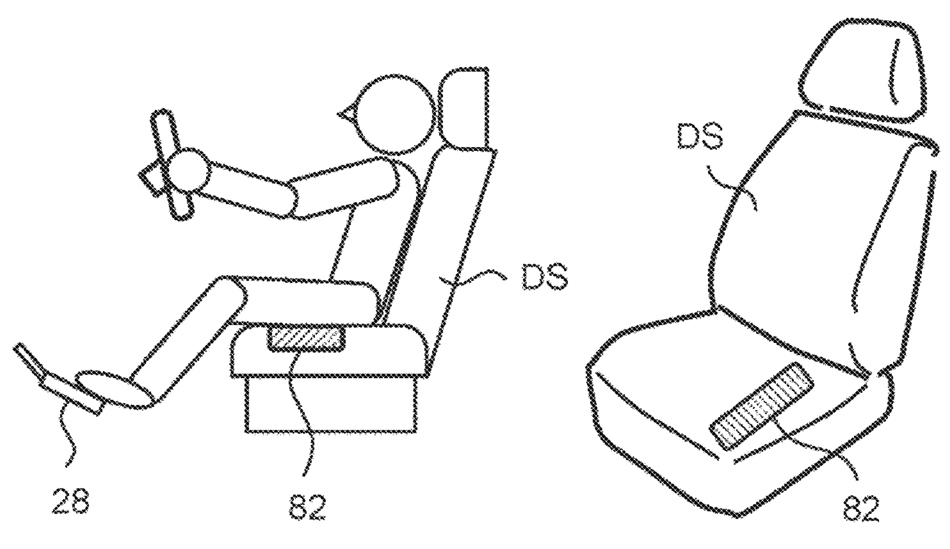

FIG. 7 is a conceptual diagram for describing an outline of the second embodiment. The vehicle 10 includes an accelerator pedal 22, a brake pedal 23, a pseudo clutch pedal 28, and a pseudo shift lever 27 (pseudo shift device).

The pseudo shift lever 27 has a structure that simulates a shift lever included in the MT vehicle. The disposition and operational feeling of the pseudo shift lever 27 are equivalent to those in the actual MT vehicle. For the pseudo shift lever 27, for example, positions corresponding to gear steps: first gear, second gear, third gear, fourth gear, fifth gear, sixth gear, reverse, and neutral are provided.

The pseudo clutch pedal 28 has a structure that simulates the clutch pedal included in the MT vehicle. The disposition and operational feeling of the pseudo clutch pedal 28 are equivalent to those in the actual MT vehicle. The pseudo clutch pedal 28 is operated at the time of the operation of the pseudo shift lever 27. That is, when the driver wants to perform the setting alteration of the gear step by the pseudo shift lever 27, the driver depresses the pseudo clutch pedal 28. When the setting alteration of the gear step finishes, the driver terminates the depressing, and returns the pseudo clutch pedal 28 to the original position.

The driving mode of the vehicle 10 (battery electric vehicle) includes a "three-pedal mode" in which the manual gear shifting behavior and driving characteristic of the MT vehicle are simulated. In the three-pedal mode, the output of the electric motor with respect to the operation of the accelerator pedal 22 is changed depending on the operation of the pseudo clutch pedal 28 and the operation of the pseudo shift lever 27. A method for realizing the three-pedal mode in the battery electric vehicle will be described later in Section 6 in detail.

In the three-pedal mode, the vehicle control system 100 acquires the physical fatigue degree P of the driver, using the sensor 70 that is equipped in the vehicle 10. For example, the sensor 70 includes a clutch position sensor 72 for detecting the operation (depressing amount) of the pseudo clutch pedal 28. The vehicle control system 100 acquires the physical fatigue degree P, based on at least one of the number of times of the operation of the pseudo clutch pedal 28 in a certain time and the operation time of the pseudo clutch pedal 28 in the certain time. As the number of times of the operation of the pseudo clutch pedal 28 in the certain time increases, the physical fatigue degree P also increases. Further, as the operation time of the pseudo clutch pedal 28 in the certain time increases, the physical fatigue degree P also increases. The physical fatigue degree P may be calculated based on the multiplication of the number of times of the operation of the pseudo clutch pedal 28 in the certain time and the operation time of the pseudo clutch pedal 28 in the certain time.

The actuation condition for actuating the massage apparatus 80 includes at least the condition that the physical fatigue degree P of the driver exceeds the first threshold Pth1. In the case where the actuation condition is satisfied, the vehicle control system 100 (processor 101) actuates the massage apparatus 80 that is installed at the driver's seat DS of the vehicle 10. The massage apparatus 80 includes a bearing-surface massage apparatus 82 that is embedded in a bearing-surface seat of the driver's seat DS. Particularly, the bearing-surface massage apparatus 82 is provided at a position where the thigh of the left leg of the driver touches. For example, the bearing-surface massage apparatus 82 is a roller.

By the actuation of the bearing-surface massage apparatus 82, the fatigue of the left leg due to the operation of the pseudo clutch pedal 28 is alleviated. As a result, the driver can more comfortably drive the vehicle 10. Particularly, the driver can comfortably drive the vehicle 10 while enjoying the three-pedal mode.

2-2. Exemplary Functional Configuration and Exemplary Process

Figure 8:
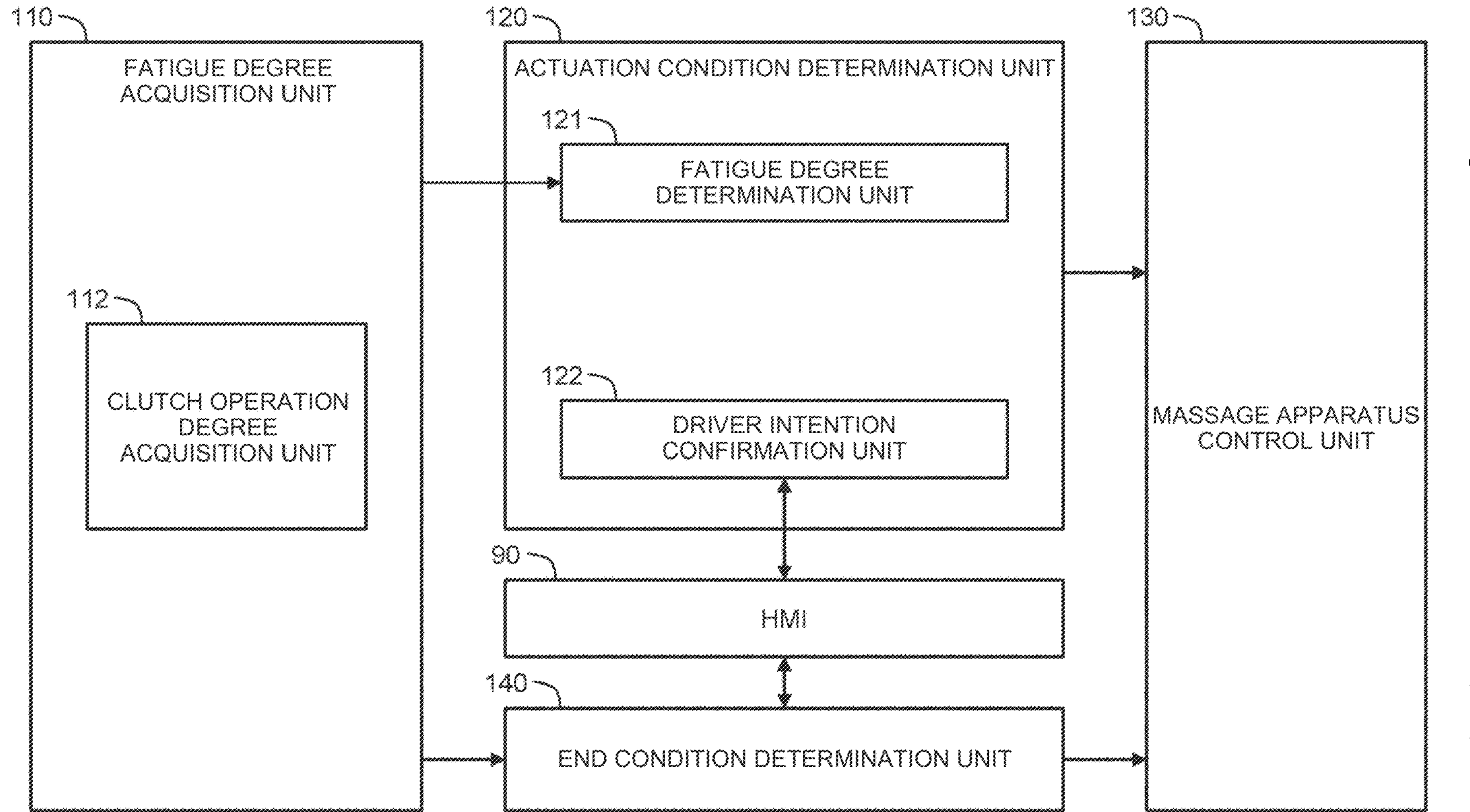
FIG. 8 is a block diagram showing an exemplary functional configuration of a vehicle control system according to the second embodiment.
Figure 9:
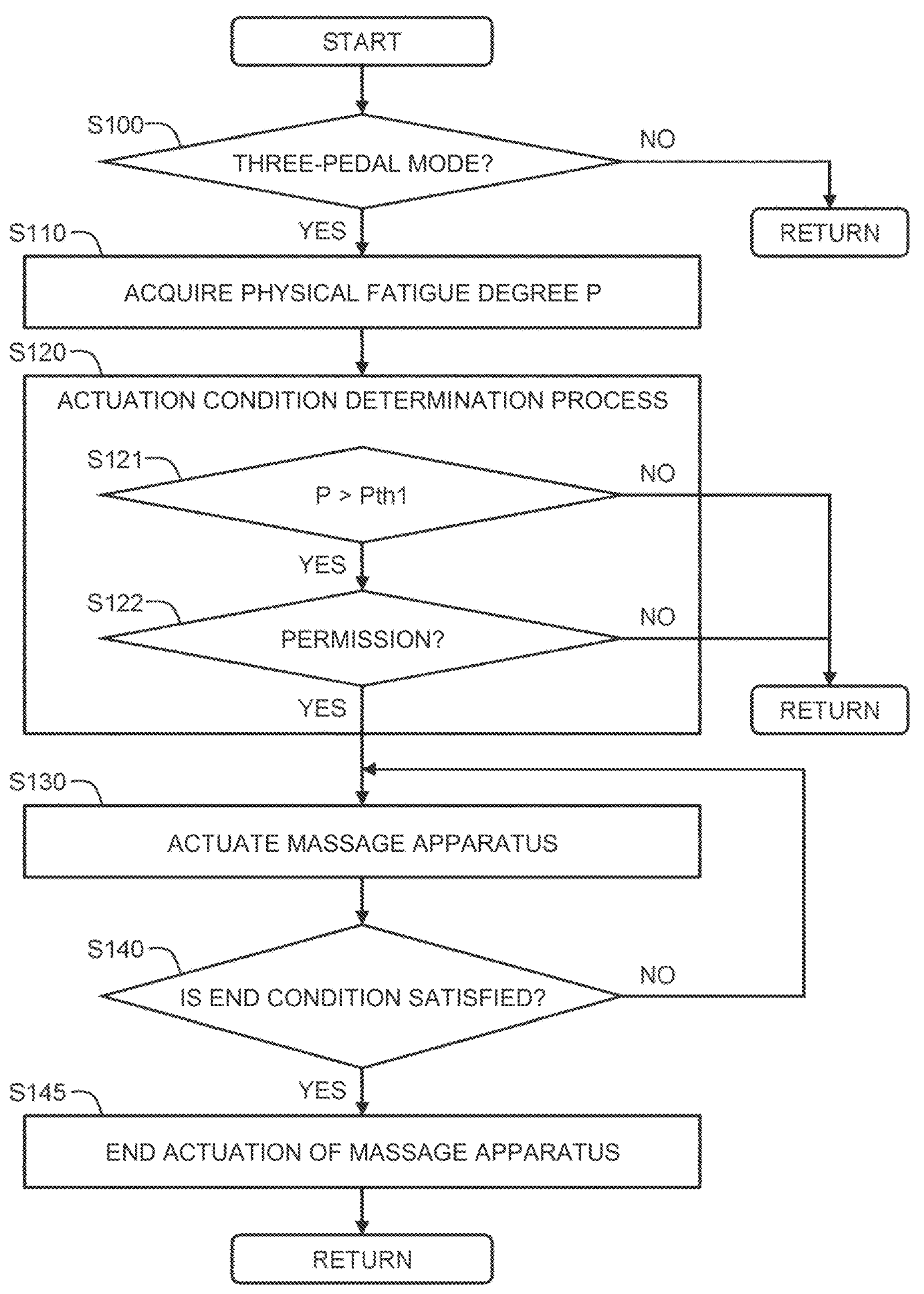
FIG. 9 is a flowchart showing an exemplary process by the vehicle control system according to the second embodiment.

FIG. 8 is a block diagram showing an exemplary functional configuration of the vehicle control system 100 according to the second embodiment. FIG. 9 is a flowchart showing an exemplary processing by the vehicle control system 100 according to the second embodiment. The same descriptions as those in the above first embodiment are omitted when appropriate.

In step S100, the vehicle control system 100 determines whether the driving mode of the vehicle 10 (battery electric vehicle) is the three-pedal mode. In the case where the driving mode is not the three-pedal mode (step S100; No), the process in this cycle ends. On the other hand, in the case where the driving mode is the three-pedal mode (step S100; Yes), the process proceeds to step S110. In the case where the vehicle 10 is an ordinary MT vehicle, step S100 is skipped.

In step S110, the fatigue degree acquisition unit 110 acquires the sensor detection information indicating the detection result of the sensor 70 that is equipped in the vehicle 10. In the case where the fatigue degree acquisition unit 110 is included in the management server, the fatigue degree acquisition unit 110 communicates with the vehicle 10, and acquires the sensor detection information. The fatigue degree acquisition unit 110 acquires the physical fatigue degree P of the driver, based on the sensor detection information.

For example, the fatigue degree acquisition unit 110 includes a clutch operation degree acquisition unit 112. The clutch operation degree acquisition unit 112 acquires at least one of the number of times of the operation of the pseudo clutch pedal 28 and the operation time of the pseudo clutch pedal 28 that are detected by the clutch position sensor 72. At least one of the number of times of the operation of the pseudo clutch pedal 28 and the operation time of the pseudo clutch pedal 28 corresponds to the sensor detection information. The fatigue degree acquisition unit 110 acquires the physical fatigue degree P, based on at least one of the number of times of the operation of the pseudo clutch pedal 28 in the certain time and the operation time of the pseudo clutch pedal 28 in the certain time. As the number of times of the operation of the pseudo clutch pedal 28 in the certain time increases, the physical fatigue degree P also increases.

Further, as the operation time of the pseudo clutch pedal 28 in the certain time increases, the physical fatigue degree P also increases. The physical fatigue degree P may be calculated based on the multiplication of the number of times of the operation of the pseudo clutch pedal 28 in the certain time and the operation time of the pseudo clutch pedal 28 in the certain time.

Step S120, step S130, and step S140 are the same as those in the first embodiment. In step S130, the massage apparatus control unit 130 actuates the bearing-surface massage apparatus 82 that is installed at the bearing-surface seat of the driver's seat DS.

2-3. Modification

Figure 10:
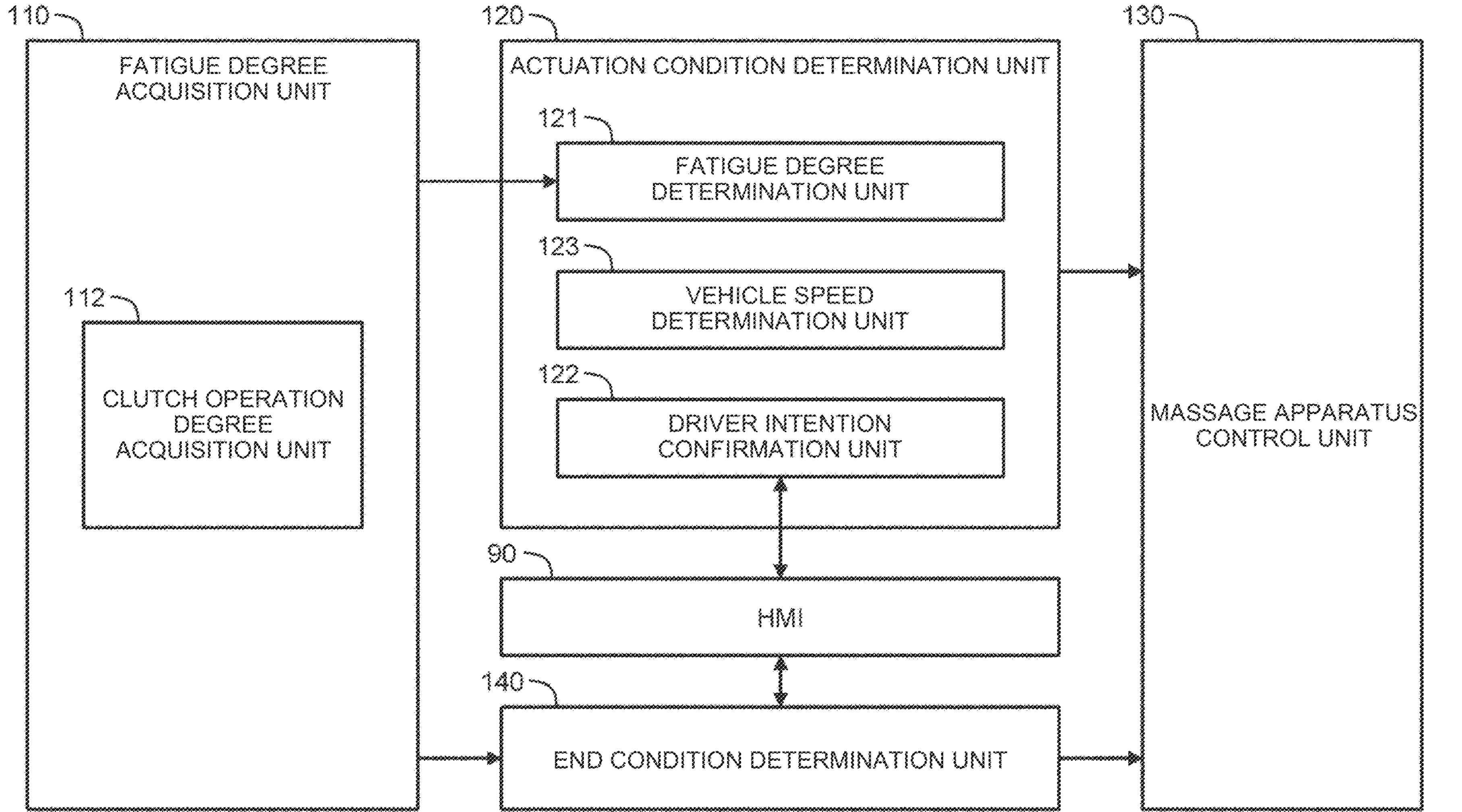
FIG. 10 is a block diagram showing an exemplary functional configuration of a vehicle control system according to a modification of the second embodiment.

FIG. 10 is a block diagram showing an exemplary functional configuration of a vehicle control system 100 according to a modification. In the modification, the predetermined actuation condition further includes a third condition, in addition to the above first condition and the above second condition. The third condition is that the speed of the vehicle 10 is lower than a predetermined speed Vth. The actuation condition determination unit 120 includes a vehicle speed determination unit 123, in addition to the above fatigue degree determination unit 121 and the above driver intention confirmation unit 122. The vehicle speed determination unit 123 and step S123 are the same as those in the above case of FIG. 5 and FIG. 6.

As another modification, the predetermined actuation condition may exclude the second condition. In that case, step S122 is skipped.

3. Third Embodiment 3-1. Outline

Figure 11:
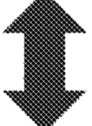
FIG. 11 is a conceptual diagram for describing an outline of a third embodiment.

FIG. 11 is a conceptual diagram for describing an outline of a third embodiment. A vehicle 10 assumed in the third embodiment is a battery electric vehicle that uses an electric motor as a dynamic power device for traveling and that includes the pseudo clutch pedal 28 and the pseudo shift lever 27. The driving mode of the vehicle 10 (battery electric vehicle) includes the above "three-pedal mode". In the three-pedal mode, the operation of the pseudo clutch pedal 28 is necessary, and the manual gear shifting behavior and driving characteristic of the MT vehicle are simulated based on the operation of the pseudo clutch pedal 28.

The driving mode of the vehicle 10 (battery electric vehicle) further includes a "two-pedal mode" in which the operation of the pseudo clutch pedal 28 is not necessary. For example, the two-pedal mode includes an EV mode in which the vehicle 10 is driven as an ordinary battery electric vehicle. As another example, the two-pedal mode may include an AT mode in which the driving characteristic of an automatic transmission vehicle (AT vehicle) is simulated. Furthermore, as another example, the two-pedal mode may include a sequential shift mode in which the manual gear shifting behavior and driving characteristic of a sequential shift type MT vehicle are simulated. A method for realizing the sequential shift mode in the battery electric vehicle will be described later in Section 6 in detail.

During the three-pedal mode, the vehicle control system 100 (processor 101) determines whether a predetermined mode switching condition is satisfied. The predetermined mode switching condition includes at least a condition that the physical fatigue degree P of the driver exceeds a second threshold Pth2. The second threshold Pth2 may be the same as the first threshold Pth1, or may be different from the first threshold Pth1. In the case where the predetermined mode switching condition is satisfied during the three-pedal mode, the vehicle control system 100 (processor 101) switches the driving mode from the three-pedal mode in which the operation of the pseudo clutch pedal 28 is necessary to the two-pedal mode in which the operation of the pseudo clutch pedal 28 is not necessary. Thereby, the driver is freed from the operation of the pseudo clutch pedal 28, and therefore, the physical fatigue of the driver is alleviated. As a result, the driver can more comfortably drive the vehicle 10.

The two-pedal mode may include the sequential shift mode and another mode (at least one of the AT mode and the EV mode). In this case, the vehicle control system 100 may switch the driving mode in the two-pedal mode, in a stepwise manner. For example, in the case where the physical fatigue degree P exceeds the second threshold Pth2, the vehicle control system 100 switches the driving mode from the three-pedal mode to the sequential shift mode. In the case where the physical fatigue degree P does not become equal to or lower than the second threshold Pth2 even when a certain time elapses from the start of the sequential shift mode, the vehicle control system 100 may switch the driving mode from the sequential shift mode to the AT mode or the EV mode.

3-2. Exemplary Functional Configuration and Exemplary Process

Figure 12:
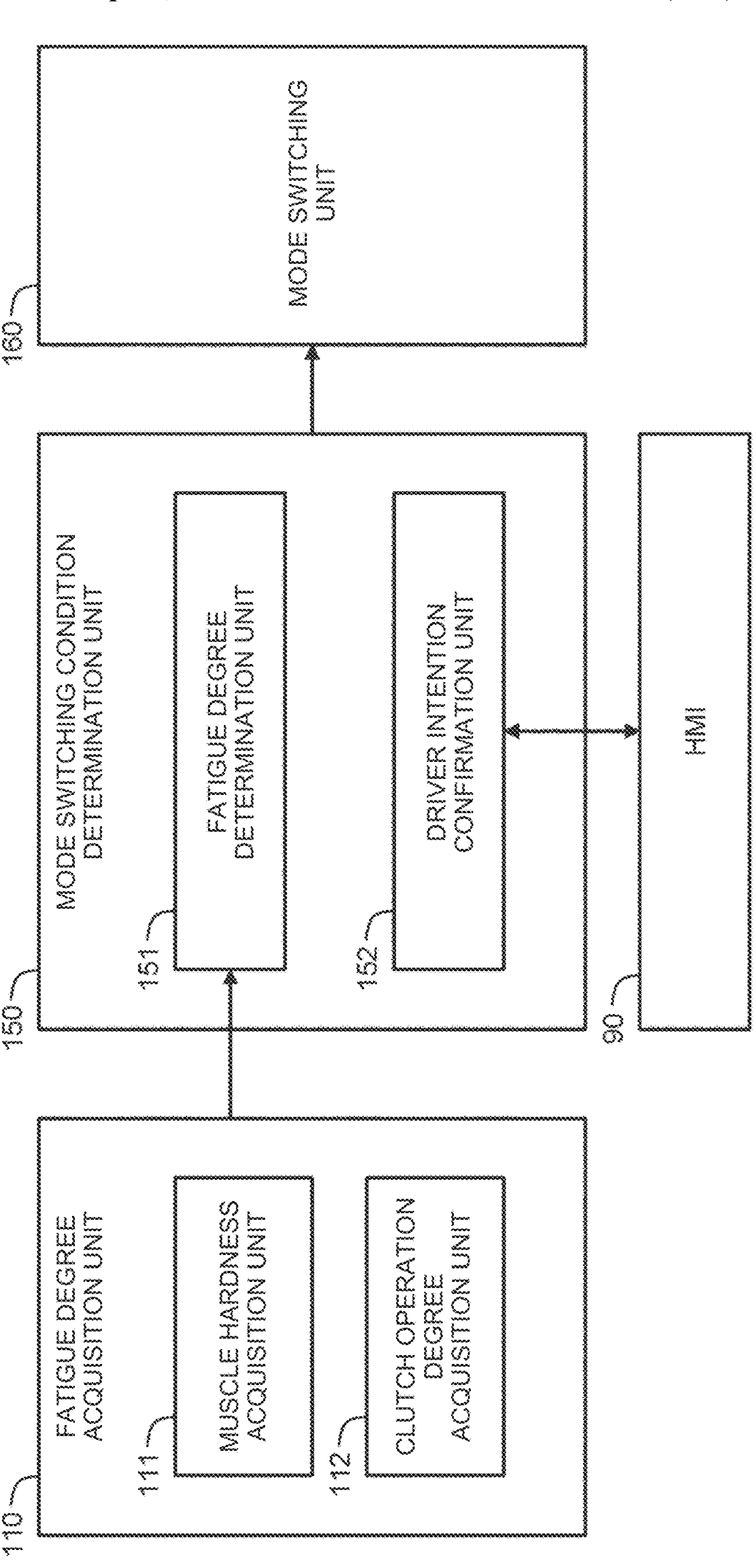
FIG. 12 is a block diagram showing an exemplary functional configuration of a vehicle control system according to the third embodiment.

FIG. 12 is a block diagram showing an exemplary functional configuration of the vehicle control system 100 according to a third embodiment. The vehicle control system 100 includes a fatigue degree acquisition unit 110, a mode switching condition determination unit 150, and a mode switching unit 160, as functional blocks. The functional blocks may be realized by the cooperation between the processor 101 that executes the vehicle control program 105 and the storage device 102. Some of the functional blocks may be included in the management server that can communicate with the vehicle 10.

Figure 13:
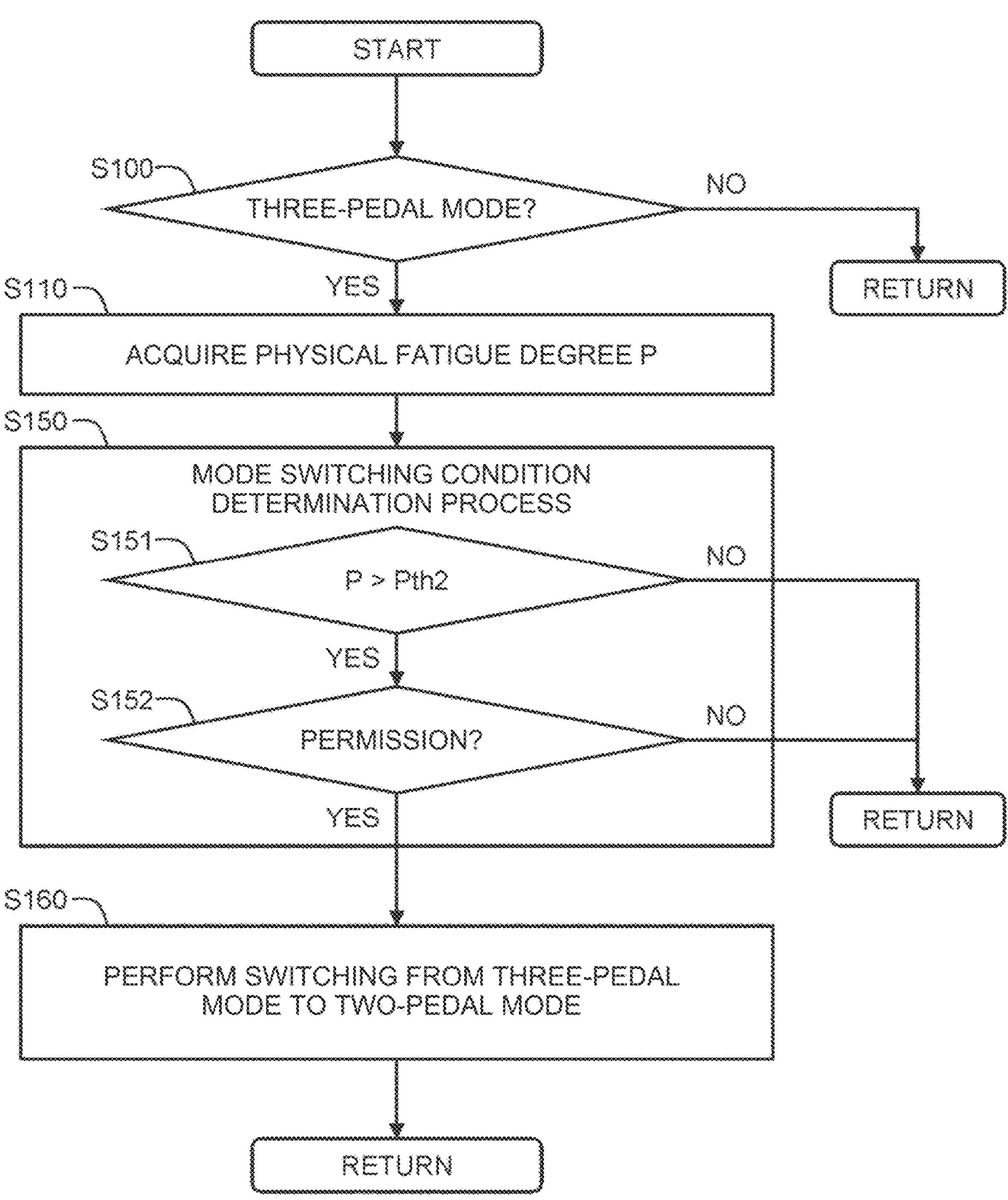
FIG. 13 is a flowchart showing an exemplary process by the vehicle control system according to the third embodiment.

FIG. 13 is a flowchart showing an exemplary process by the vehicle control system 100 according to the third embodiment. With reference to FIG. 12 and FIG. 13, the exemplary process by the vehicle control system 100 will be described below.

In step S100, the vehicle control system 100 determines whether the driving mode of the vehicle 10 (battery electric vehicle) is the three-pedal mode. In the case where the driving mode is not the three-pedal mode (step S100; No), the process in this cycle ends. On the other hand, in the case where the driving mode is the three-pedal mode (step S100; Yes), the process proceeds to step S110.

In step S110, the fatigue degree acquisition unit 110 acquires the sensor detection information indicating the detection result of the sensor 70 that is equipped in the vehicle 10. In the case where the fatigue degree acquisition unit 110 is included in the management server, the fatigue degree acquisition unit 110 communicates with the vehicle 10, and acquires the sensor detection information. The fatigue degree acquisition unit 110 acquires the physical fatigue degree P of the driver, based on the sensor detection information. For example, the fatigue degree acquisition unit 110 includes at least one of the above muscle hardness acquisition unit 111 and the above clutch operation degree acquisition unit 112. The fatigue degree acquisition unit 110 may include both of the muscle hardness acquisition unit 111 and the clutch operation degree acquisition unit 112.

In step S150, the mode switching condition determination unit 150 determines whether the predetermined mode switching condition is satisfied. In the case where the predetermined mode switching condition is not satisfied (step S150; No), the process in this cycle ends. On the other hand, in the case where the predetermined mode switching condition is satisfied (step S150; Yes), the process proceeds to step S160.

In the example shown in FIG. 12 and FIG. 13, the predetermined mode switching condition includes a first condition and a second condition. The first condition is that the physical fatigue degree P exceeds the second threshold Pth2. The second condition is that the driver permits the switching from the three-pedal mode to the two-pedal mode. The mode switching condition determination unit 150 includes a fatigue degree determination unit 151 and a driver intention confirmation unit 152, for determining whether the first condition and the second condition are satisfied, respectively. At least one of the fatigue degree determination unit 151 and the driver intention confirmation unit 152 may be included in the management server that can communicate with the vehicle 10.

In step S151, the fatigue degree determination unit 151 determines whether the physical fatigue degree P is higher than the second threshold Pth2, that is, whether the first condition is satisfied. In the case where the first condition is not satisfied (step S151; No), the mode switching condition is not satisfied. On the other hand, in the case where the first condition is satisfied (step S151; Yes), the process proceeds to step S152.

In step S152, the driver intention confirmation unit 152 determines whether the driver has permitted the switching from the three-pedal mode to the two-pedal mode, that is, whether the second condition is satisfied. More specifically, the driver intention confirmation unit 152 inquires of the driver whether to agree to the switching of the driving mode from the three-pedal mode to the two-pedal mode, through the output device of the HMI 90. An inquiry message may be displayed on the display, may be given from the speaker, or may be output from both the display and the speaker. In response to the inquiry message, the driver inputs "permission" or "rejection", using the input device of the HMI 90. The driver intention confirmation unit 152 can determine whether the second condition is satisfied, based on the input from the driver. In the case where the second condition is not satisfied (step S152; No), the actuation condition is not satisfied. On the other hand, in the case where the second condition is satisfied (step S152; Yes), the actuation condition is satisfied (step S150; Yes), and the process proceeds to step S160.

In step S160, the mode switching unit 160 switches the driving mode from the three-pedal mode to the two-pedal mode. When the driving mode is switched, the mode switching unit 160 may notify the driver that the driving mode is switched, through the output device of the HMI 90.

3-3. Modification

The predetermined mode switching condition may exclude the second condition. In that case, step S152 is skipped.

4. Fourth Embodiment

Figure 14:
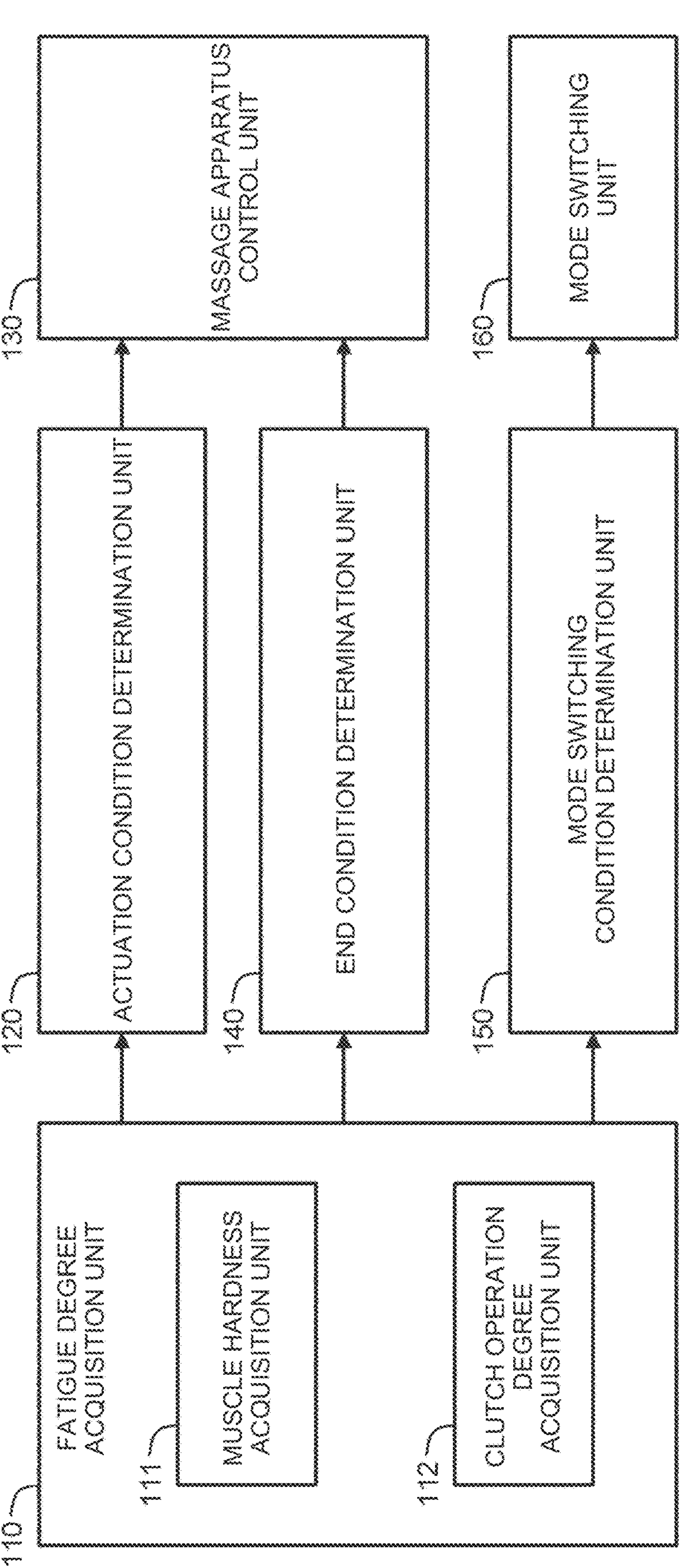
FIG. 14 is a block diagram showing an exemplary functional configuration of a vehicle control system according to a fourth embodiment.

A fourth embodiment is a combination of the above second embodiment and the above third embodiment. FIG. 14 is a block diagram showing an exemplary functional configuration of a vehicle control system 100 according to the fourth embodiment. The vehicle control system 100 includes a fatigue degree acquisition unit 110, an actuation condition determination unit 120, a massage apparatus control unit 130, an end condition determination unit 140, a mode switching condition determination unit 150, and a mode switching unit 160, as functional blocks. The actuation condition determination unit 120 and the massage apparatus control unit 130 are the same as those in the above second embodiment. The fatigue degree acquisition unit 110, the mode switching condition determination unit 150, and the mode switching unit 160 are the same as those in the above third embodiment.

The actuation condition determination unit 120 and the mode switching condition determination unit 150 may behave independently from each other. That is, the vehicle control system 100 may determine whether the actuation condition is satisfied and whether the mode switching condition is satisfied, in parallel.

Alternatively, the actuation condition determination unit 120 and the mode switching condition determination unit 150 may behave in collaboration with each other. That is, the vehicle control system 100 may determine whether the actuation condition is satisfied and whether the mode switching condition is satisfied, in series.

Figure 15:
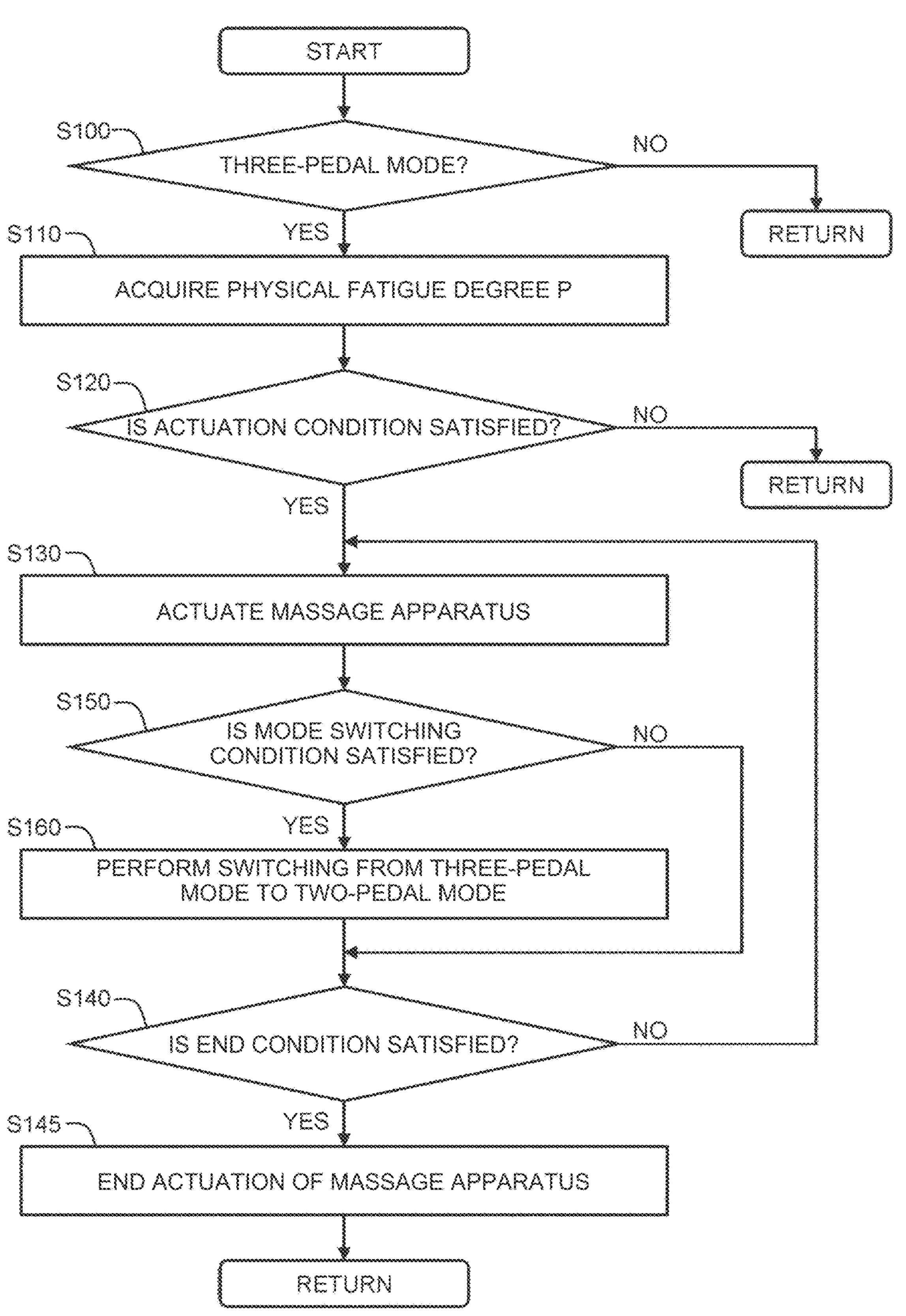
FIG. 15 is a flowchart showing an exemplary process by the vehicle control system according to the fourth embodiment.

In an example shown in FIG. 15, first, the actuation condition determination unit 120 determines whether the actuation condition is satisfied. In the case where the actuation condition is satisfied (step S120; Yes), the massage apparatus control unit 130 actuates the massage apparatus 80 (step S130). Thereafter, the mode switching condition determination unit 150 determines whether the mode switching condition is satisfied. In the case where the mode switching condition is satisfied (step S150; Yes), the mode switching unit 160 switches the driving mode from the three-pedal mode to the two-pedal mode (step S160).

Figure 16:
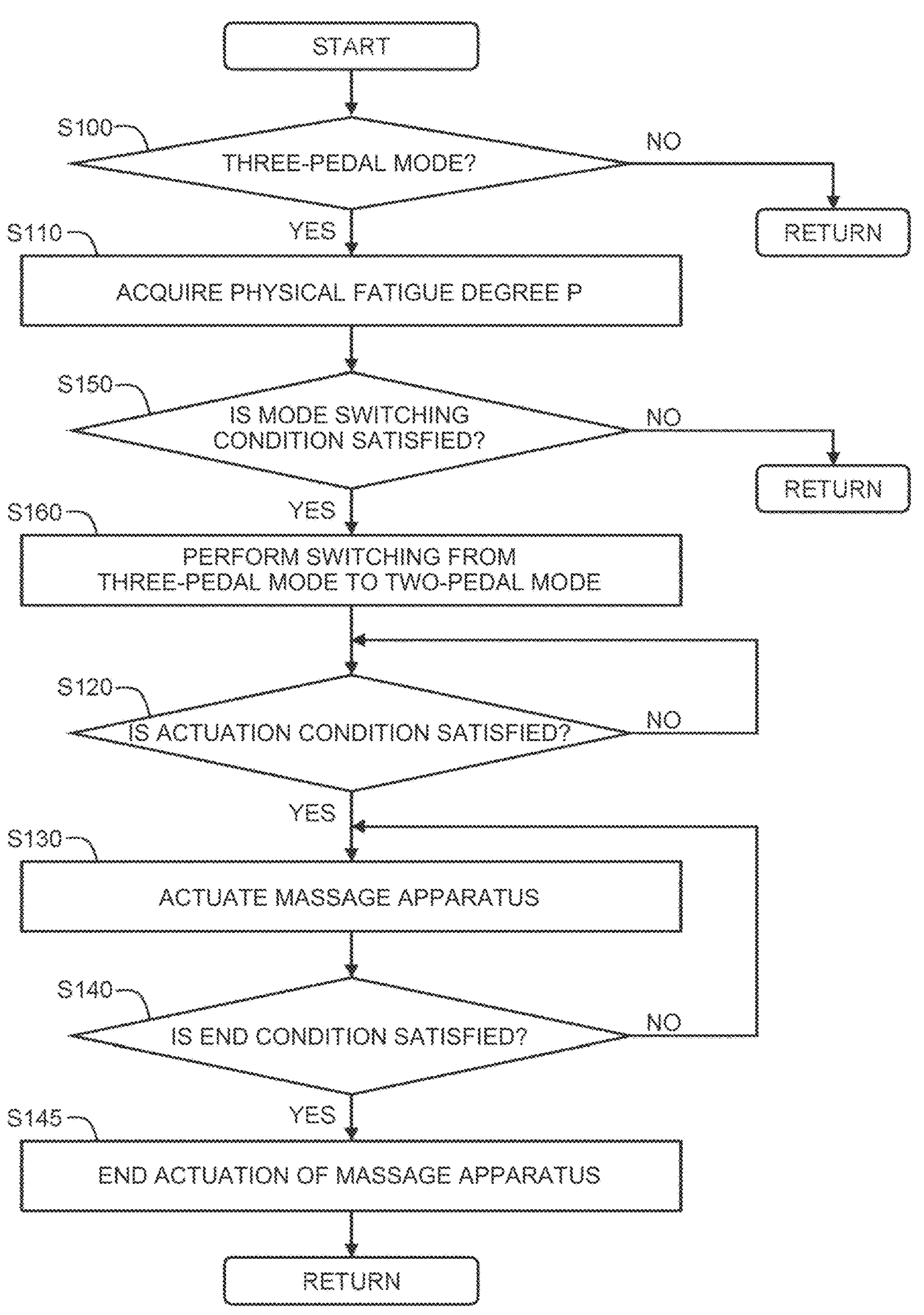
FIG. 16 is a flowchart showing another exemplary process by the vehicle control system according to the fourth embodiment.

In an example shown in FIG. 16, first, the mode switching condition determination unit 150 determines whether the mode switching condition is satisfied. In the case where the mode switching condition is satisfied (step S150; Yes), the mode switching unit 160 switches the driving mode from the three-pedal mode to the two-pedal mode (step S160). Thereafter, the actuation condition determination unit 120 determines whether the actuation condition is satisfied. In the case where the actuation condition is satisfied (step S120; Yes), the massage apparatus control unit 130 actuates the massage apparatus 80 (step S130).

5. Fifth Embodiment

A combination of the first embodiment and one of the second to fourth embodiments can be also adopted.

6. Details of MT Mode

An electric motor that is used as a dynamic power device for traveling in a general battery electric vehicle has a greatly different torque characteristic from an internal combustion engine that is used as a dynamic power device for traveling in a conventional vehicle (CV). Because of the difference in the torque characteristic of the dynamic power device, the CV needs to include a transmission, but the general battery electric vehicle does not include the transmission. Naturally, the general battery electric vehicle does not include a manual transmission (MT) in which the gear ratio is switched by the driver's manual operation. Therefore, the driving feeling is greatly different between the driving of the conventional vehicle with the MT (referred to as an MT vehicle, hereinafter) and the driving of the battery electric vehicle.

Meanwhile, in the electric motor, it is possible to control the torque relatively easily, by controlling the voltage and field that are applied. Accordingly, in the electric motor, it is possible to obtain a desired torque characteristic within the operating range of the electric motor, by executing an adequate control. With use of this feature, it is possible to simulate the torque characteristic specific to the MT vehicle, by controlling the torque of the battery electric vehicle. Further, it is possible to provide a pseudo shifter in the battery electric vehicle, such that the driver can obtain a driving feeling similar to a driving feeling for the MT vehicle. Thus, in the battery electric vehicle, it is possible to simulate the MT vehicle.

That is, the battery electric vehicle controls the output of the electric motor so as to simulate the driving characteristic (torque characteristic) specific to the MT vehicle. The driver performs a pseudo manual gear shifting operation by operating the pseudo shifter. In response to the pseudo manual gear shifting operation by the driver, the battery electric vehicle changes the driving characteristic (torque characteristic) so as to simulate the MT vehicle. Thereby, the driver of the battery electric vehicle can feel as if the driver was driving the MT vehicle. The control mode of the electric motor for simulating the driving characteristic of the MT vehicle and the manual gear shifting operation in this way is referred to as a "manual mode" or "MT mode", hereinafter.

A case where the vehicle 10 according to the present disclosure is a battery electric vehicle 10E having the MT mode will be discussed below. In the MT mode, the battery electric vehicle 10E may generate a pseudo engine sound that depends on driver's driving operation, and may output the pseudo engine sound through the speaker. Not only the driving operation of the MT vehicle but also the engine sound of the MT vehicle are reproduced, and therefore, the satisfaction level for a driver that wants reality increases. Exemplary configurations of the battery electric vehicle 10E having the MT mode will be described below. Examples of the MT mode include the "sequential shift mode" and the "three-pedal mode".

6-1. First Exemplary Configuration (Sequential Shift Mode)

Figure 17:
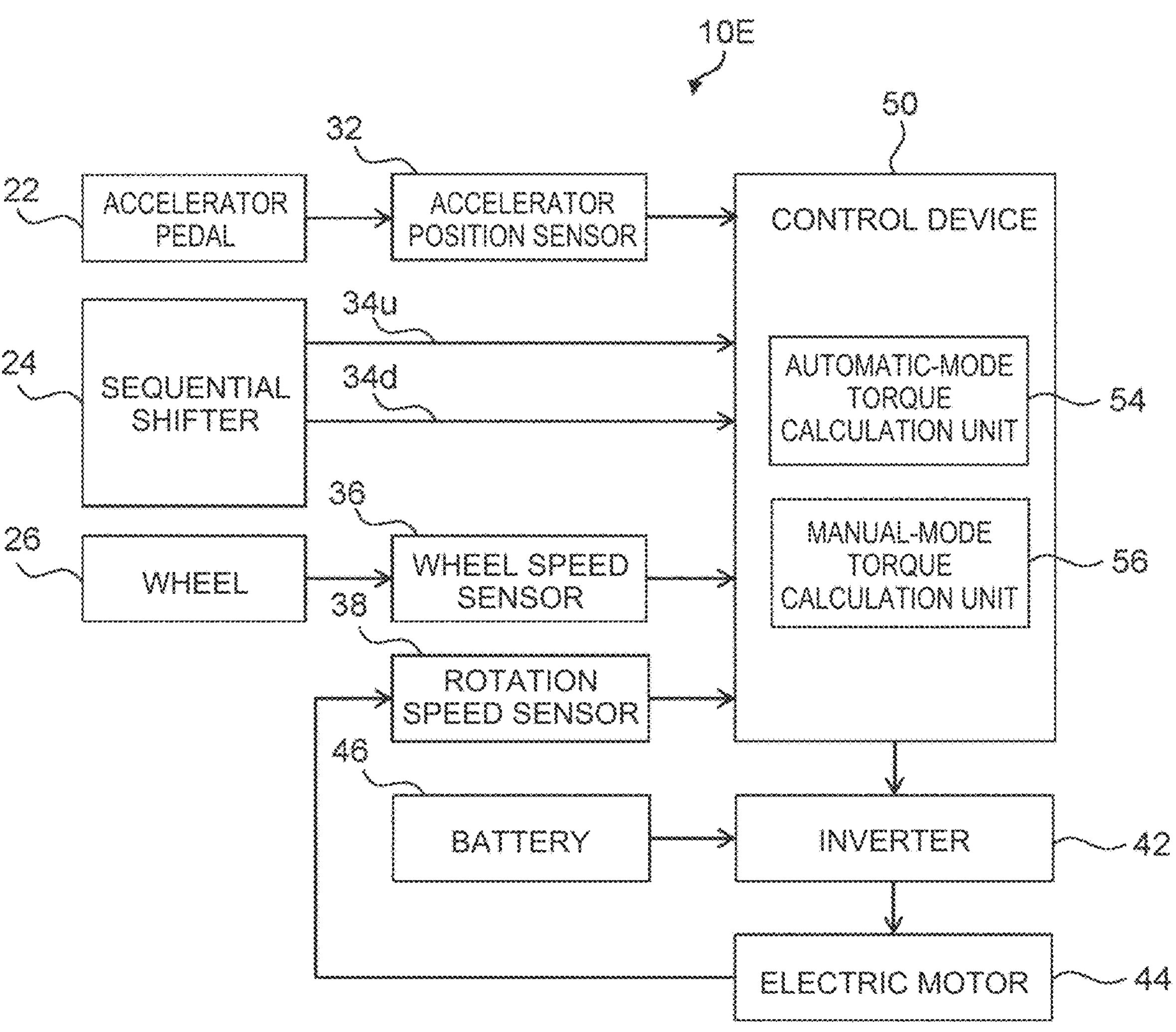
FIG. 17 is a block diagram showing a first exemplary configuration of a dynamic power control system of a battery electric vehicle.

FIG. 17 is a block diagram showing a first exemplary configuration of a dynamic power control system of the battery electric vehicle 10E. The battery electric vehicle 10E includes an electric motor 44, a battery 46, and an inverter 42. The electric motor 44 is a dynamic power device for traveling. The battery 46 stores electric energy for driving the electric motor 44. That is, the battery electric vehicle 10E is a battery electric vehicle (BEV) that travels using the electric energy stored in the battery 46. The inverter 42 converts direct-current electric power that is input from the battery 46 at the time of acceleration, into drive electric power for the electric motor 44. Further, the inverter 42 converts regenerative electric power that is input from the electric motor 44 at the time of deceleration, into direct-current electric power, to charge the battery 46.

The battery electric vehicle 10E includes an accelerator pedal 22 by which the driver inputs an acceleration request for the battery electric vehicle 10E. The accelerator pedal 22 is provided with an accelerator position sensor 32 for detecting an accelerator operation amount.

The battery electric vehicle 10E includes a sequential shifter 24. The sequential shifter 24 may be a paddle-type shifter, or may be a lever-type pseudo shifter.

The paddle-type shifter is a dummy that is different from an original paddle-type shifter. The paddle-type shifter has a structure that resembles a paddle-type shifter included in a clutch pedal-less MT vehicle. The paddle-type shifter is attached to a steering wheel. The paddle-type shifter includes an upshift switch and a downshift switch that determine an operation position. The upshift switch sends an upshift signal 34*u*, by being pulled toward the driver, and the downshift switch sends a downshift signal 34*d*, by being pulled toward the driver.

Similarly to the paddle-type shifter, the lever-type pseudo shifter is a dummy that is different from an original shifter. The lever-type pseudo shifter has a structure that resembles a lever-type shifter included in the clutch pedal-less MT vehicle. The lever-type pseudo shifter outputs the upshift signal 34*u* when the shift lever is turned down forward, and outputs the downshift signal 34*d* when the shift lever is turned down rearward.

A wheel 26 of the battery electric vehicle 10E is provided with a wheel speed sensor 36. The wheel speed sensor 36 is used as a vehicle speed sensor for detecting the vehicle speed of the battery electric vehicle 10E. Further, the electric motor 44 is provided with a rotation speed sensor 38 for detecting the rotation speed of the electric motor 44.

The battery electric vehicle 10E includes a control device 50. Typically, the control device 50 is an electronic control unit (ECU) that is equipped in the battery electric vehicle 10E. The control device 50 may be a combination of a plurality of ECUs. The control device 50 includes an interface, a memory, and a processor. The interface is connected to an in-vehicle network. The memory includes a RAM that temporarily records data and a ROM that saves programs capable of being executed by the processor and a variety of data related to the programs. The program is constituted by a plurality of instructions. The processor reads programs and data from the memory, to execute the program and the data, and generates a control signal based on signals that are acquired from sensors.

For example, the control device 50 controls the electric motor 44 by the PWM control of the inverter 42. The control device 50 receives signals from the accelerator position sensor 32, the sequential shifter 24 (the upshift switch and the downshift switch in the case where the sequential shifter 24 is a paddle-type shifter), the wheel speed sensor 36, and the rotation speed sensor 38. The control device 50 processes these signals, and calculates a motor torque command value for the PWM control of the inverter 42.

The control device 50 includes an automatic mode (EV mode) and a manual mode (MT mode) as the control mode. The automatic mode is an ordinary control mode for driving the battery electric vehicle 10E as a general battery electric vehicle. In the automatic mode, by programs, the output of the electric motor 44 is continuously changed in response to the operation of the accelerator pedal 22. On the other hand, the manual mode is a control mode for driving the battery electric vehicle 10E like an MT vehicle. In the manual mode, by programs, the output characteristic of the electric motor 44 with respect to the operation of the accelerator pedal 22 is changed in response to the upshift operation and downshift operation of the sequential shifter 24. The manual mode (MT mode) corresponds to the "sequential shift mode". The switching between the automatic mode and the manual mode is possible.

The control device 50 includes an automatic-mode torque calculation unit 54 and a manual-mode torque calculation unit 56. The units 54, 56 may be ECUs that are independent from each other, or may be functions of an ECU that are obtained when programs recorded in the memory are executed by the processor.

The automatic-mode torque calculation unit 54 has a function to calculate the motor torque when the electric motor 44 is controlled in the automatic mode. In the automatic-mode torque calculation unit 54, a motor torque command map is stored. The motor torque command map is a map that determines the motor torque from the accelerator operation amount and the rotation speed of the electric motor 44. The signal of the accelerator position sensor 32 and the signal of the rotation speed sensor 38 are input to parameters of the motor torque command map. The motor torque command map outputs a motor torque corresponding to the input signals. Therefore, in the automatic mode, even when the driver operates the sequential shifter 24, the operation is not reflected in the motor torque.

The manual-mode torque calculation unit 56 includes a MT vehicle model. The MT vehicle model is a model for calculating a drive wheel torque that is to be obtained by the operation of the accelerator pedal 22 and the sequential shifter 24 under the assumption that the battery electric vehicle 10E is an MT vehicle.

Figure 18:
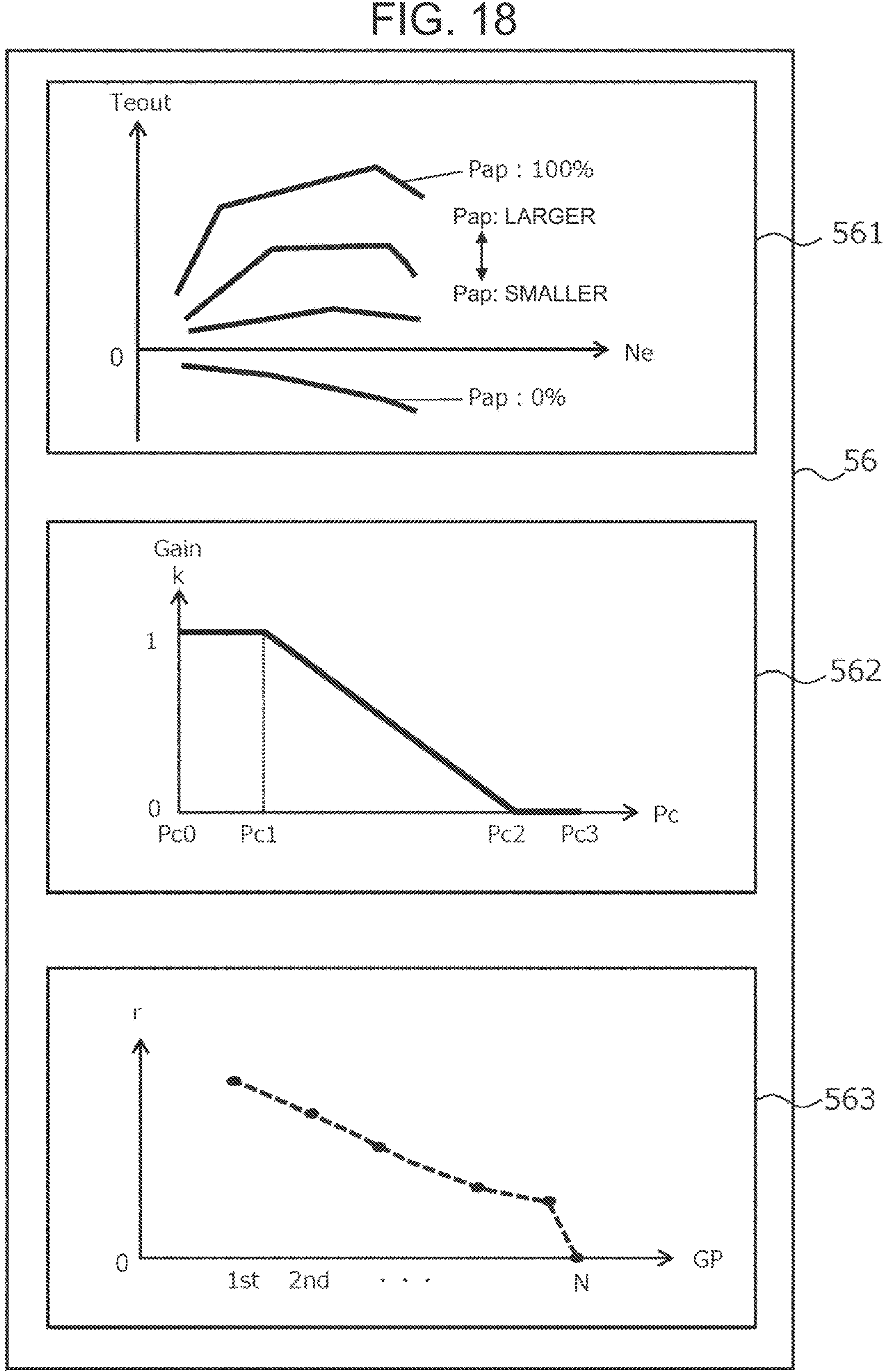
FIG. 18 is a diagram showing each example of an engine model, a clutch mode and a transmission model that constitute an MT vehicle model.

The MT vehicle model included in the manual-mode torque calculation unit 56 will be described with reference to FIG. 18. As shown in FIG. 18, the MT vehicle model includes an engine model 561, a clutch model 562, and a transmission model 563. An engine, a clutch, and a transmission that are virtually realized by the MT vehicle model are referred to as a virtual engine, a virtual clutch, and a virtual transmission, respectively. In the engine model 561, the virtual engine is modeled. In the clutch model 562, the virtual clutch is modeled. In the transmission model 563, the virtual transmission is modeled.

The engine model 561 calculates a virtual engine speed Ne and a virtual engine output torque Teout. The virtual engine speed Ne is calculated based on a rotation speed Nw of the wheel, a total speed reduction ratio R, and a slip ratio Rslip of the virtual clutch. For example, the virtual engine speed Ne is expressed as the following Expression (1)

$$Ne=Nw\times R/(1-R\text{slip}) \qquad \text{Expression (1):}$$

The virtual engine output torque Teout is calculated from the virtual engine speed Ne and an accelerator operation amount Pap. As shown in FIG. 18, a map that prescribes the relation of the accelerator operation amount Pap, the virtual engine speed Ne, and the virtual engine output torque Teout is used for the calculation of the virtual engine output torque Teout. In this map, the virtual engine output torque Teout with respect to the virtual engine speed Ne is given for each accelerator operation amount Pap. The torque characteristic shown in FIG. 18 can be set to a characteristic in which a gasoline engine is assumed, or can be set to a characteristic in which a diesel engine is assumed. Further, the torque characteristic can be set to a characteristic in which a naturally aspirated engine is assumed, or can be set to a characteristic in which a supercharged engine is assumed.

The clutch model 562 calculates a torque transmission gain k. The torque transmission gain k is a gain for calculating the torque transmission degree of the virtual clutch depending on a virtual clutch operation amount Pc. The virtual clutch operation amount Pc is ordinarily 0%, and is temporarily increased to 100% in conjunction with the switching of a virtual gear step of the virtual transmission. The clutch model 562 includes a map shown in FIG. 18. In this map, the torque transmission gain k is given with respect to the virtual clutch operation amount Pc. In FIG. 18, Pc0 corresponds to a position at which the virtual clutch operation amount Pc is 0%, and Pc3 corresponds to a position at which the virtual clutch operation amount Pc is 100%. A range from Pc0 to Pc1 and a range from Pc2 to Pc3 are dead zones in which the torque transmission gain k is not changed by the virtual clutch operation amount Pc. The clutch model 562 calculates a clutch output torque Tcout using the torque transmission gain k. The clutch output torque Tcout is a torque that is output from the virtual clutch. For example, the clutch output torque Tcout is given as the product of the virtual engine output torque Teout and the torque transmission gain k (Tcout=Teout×k).

Further, the clutch model 562 calculates the slip ratio Rslip. The slip ratio Rslip is used for the calculation of the virtual engine speed Ne in the engine model 561. For the calculation of the slip ratio Rslip, a map in which the slip ratio Rslip is given with respect to the virtual clutch operation amount Pc can be used, similarly to the torque transmission gain k.

The transmission model 563 calculates a gear ratio r. The gear ratio r is a gear ratio that is determined by a virtual gear step GP in the virtual transmission. In response to the upshift operation of the sequential shifter 24, the virtual gear step GP shifts up by one step. Further, in response to the downshift operation of the sequential shifter 24, the virtual gear step GP shifts down by one step. The transmission model 563 includes a map shown in FIG. 18. In this map, the gear ratio r is given with respect to the virtual gear step GP, such that the gear ratio r is lower as the virtual gear step GP is higher. The transmission model 563 calculates a transmission output torque Tgout, using the gear ratio r obtained from the map and the clutch output torque Tcout. For example, the transmission output torque Tgout is given as the product of the clutch output torque Tcout and the gear ratio r (Tgout=Tcout×r). The transmission output torque Tgout discontinuously changes in response to the switching of the gear ratio r. The discontinuous change in the transmission output torque Tgout generates gear shift shock, and the driving of a vehicle including a stepped transmission is reproduced.

The MT vehicle model calculates a drive wheel torque Tw using a predetermined speed reduction ratio rr. The speed reduction ratio rr is a fixed value that is determined by a mechanical structure from the virtual transmission to the drive wheel. The above-described total speed reduction ratio R is a value that is obtained by multiplying the speed reduction ratio rr by the gear ratio r. The MT vehicle model calculates the drive wheel torque Tw from the transmission output torque Tgout and the speed reduction ratio rr. For example, the drive wheel torque Tw is given as the product of the transmission output torque Tgout and the speed reduction ratio rr (Tw=Tgout×rr).

The control device 50 converts the drive wheel torque Tw calculated by the MT vehicle model, into a demand motor torque Tm. The demand motor torque Tm is a motor torque that is necessary for realizing the drive wheel torque Tw calculated by the MT vehicle model. For the conversion of the drive wheel torque Tw into the demand motor torque Tm, a speed reduction ratio from an output shaft of the electric motor 44 to the drive wheel is used. Moreover, in accordance with the demand motor torque Tm, the control device 50 controls the inverter 42 and controls the electric motor 44.

Figure 19:
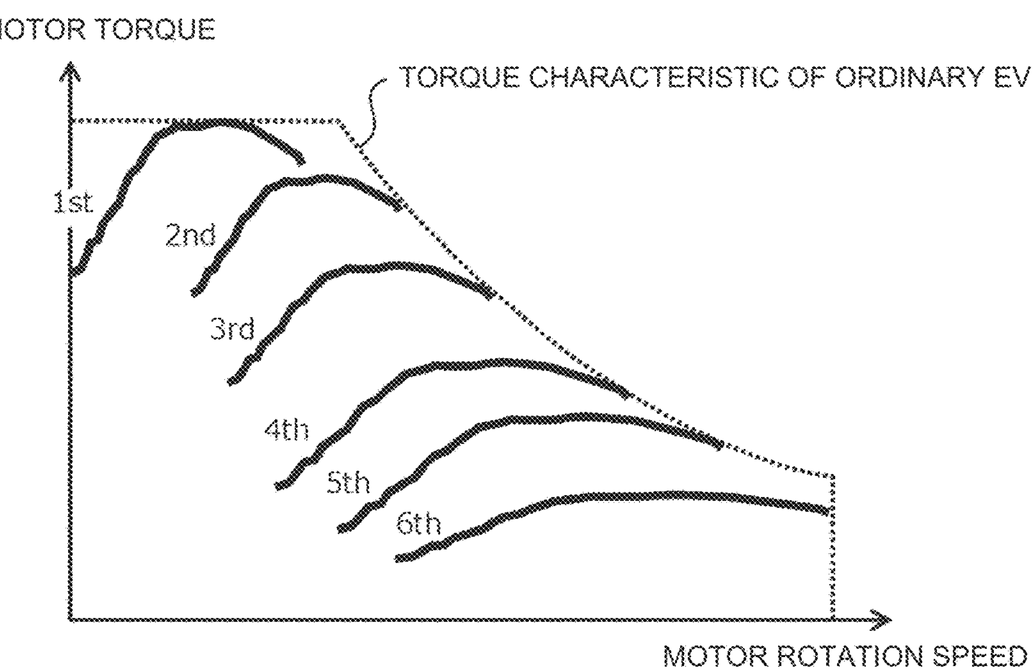
FIG. 19 is a diagram showing a torque characteristic of an electric motor that is realized by a motor control using the MT vehicle model.

FIG. 19 is a diagram showing a torque characteristic of the electric motor 44 that is realized by the motor control using the MT vehicle model, with the comparison to a torque characteristic of the electric motor 44 that is realized by an ordinary motor control for the battery electric vehicle (EV). As shown in FIG. 19, the motor control using the MT vehicle model makes it possible to realize a torque characteristic (solid lines in the figure) that simulates the torque characteristic of the MT vehicle, depending on the virtual gear step set by the sequential shifter 24. In FIG. 19, the number of gear steps is six.

6-2. Second Exemplary Configuration (Three-Pedal Mode)

Figure 20:
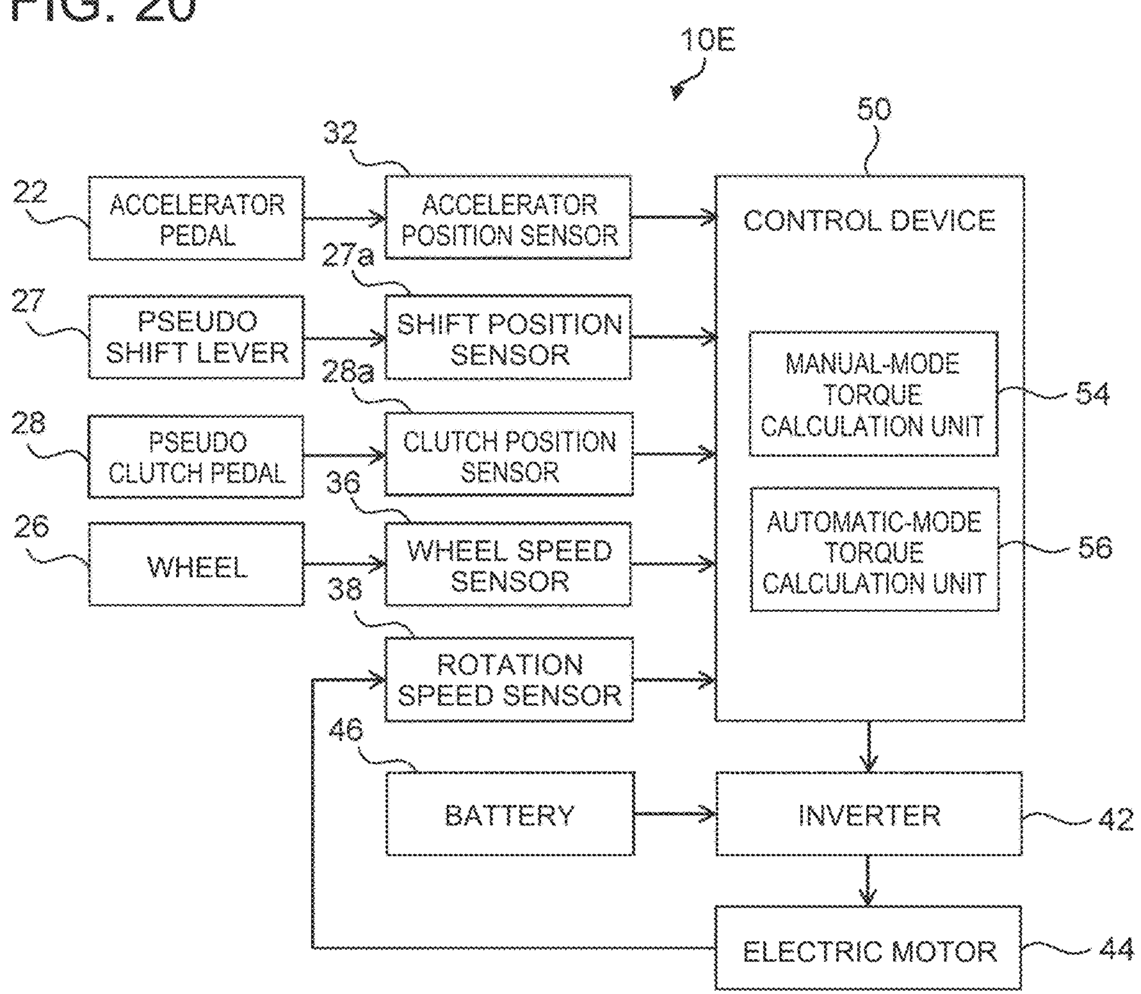
FIG. 20 is a block diagram showing a second exemplary configuration of the dynamic power control system of the battery electric vehicle.

FIG. 20 is a block diagram showing a second exemplary configuration of the dynamic control system of the battery electric vehicle 10E according to the embodiment. Only different configurations from the above first exemplary configuration will be described. Specifically, in the second exemplary configuration, the battery electric vehicle 10E includes a pseudo shift lever (pseudo shift device) 27 and a pseudo clutch pedal 28, instead of the sequential shifter 24 included in the first exemplary configuration. The pseudo shift lever 27 and the pseudo clutch pedal 28 are merely dummies that are different from an original shift lever and an original clutch pedal.

The pseudo shift lever 27 has a structure that simulates the shift lever included in the MT vehicle. The disposition and operational feeling of the pseudo shift lever 27 are equivalent to those in the actual MT vehicle. For the pseudo shift lever 27, for example, positions corresponding to gear steps: first gear, second gear, third gear, fourth gear, fifth gear, sixth gear, reverse, and neutral are provided. The pseudo shift lever 27 is provided with a shift position sensor 27*a* that detects the gear step by discriminating the position where the pseudo shift lever 27 is placed.

The pseudo clutch pedal 28 has a structure that simulates the clutch pedal included in the MT vehicle. The disposition and operational feeling of the pseudo clutch pedal 28 are equivalent to those in the actual MT vehicle. The pseudo clutch pedal 28 is operated at the time of the operation of the pseudo shift lever 27. That is, when the driver wants to perform the setting alteration of the gear step by the pseudo shift lever 27, the driver depresses the pseudo clutch pedal 28. When the setting alteration of the gear step finishes, the driver terminates the depressing, and returns the pseudo clutch pedal 28 to the original position. The pseudo clutch pedal 28 is provided with a clutch position sensor 28*a* that detects the depressing amount of the pseudo clutch pedal 28.

The control device 50 receives signals from the accelerator position sensor 32, the shift position sensor 27*a*, the clutch position sensor 28*a*, the wheel speed sensor 36, and the rotation speed sensor 38. The control device 50 processes these signals, and calculates a motor torque command value for the PWM control of the inverter 42.

Similarly to the above first exemplary configuration, the control device 50 includes an automatic mode (EV mode) and a manual mode (MT mode) as the control mode. In the automatic mode, by programs, the output of the electric motor 44 is continuously changed in response to the operation of the accelerator pedal 22. On the other hand, the manual mode is a control mode for driving the battery electric vehicle 10E like an MT vehicle. In the manual mode, by programs, the output and output characteristic of the electric motor 44 with respect to the operation of the accelerator pedal 22 is changed in response to the operation of the pseudo clutch pedal 28 and the pseudo shift lever (pseudo shift device) 27. The manual mode (MT mode) corresponds to the "three-pedal mode". The switching between the automatic mode and the manual mode is possible.

The vehicle model included in the manual-mode torque calculation unit 56 is the same as the vehicle model shown in FIG. 18. However, the virtual clutch operation amount Pc is replaced with the depressing amount of the pseudo clutch pedal 28 that is detected by the clutch position sensor 28*a*. Further, the virtual gear step GP is determined by the position of the pseudo shift lever 27 that is detected by the shift position sensor 27*a*.

What is claimed is:

1. A vehicle control system configured to control a vehicle, the vehicle control system comprising a single or plurality of processors, wherein:

the single or plurality of processors is configured to acquire a physical fatigue degree of a driver of the vehicle, using a sensor that is equipped in the vehicle, wherein the acquired physical fatigue degree is based at least in part on a characteristic of a muscle at a particular location on the driver's body;

the single or plurality of processors is configured to actuate a massage apparatus when an actuation condition is satisfied, the massage apparatus being installed at a driver's seat of the vehicle, the actuation condition including at least a condition that the physical fatigue degree exceeds a first threshold;

the vehicle is a battery electric vehicle configured to use an electric motor as a dynamic power device for traveling, and includes a pseudo clutch pedal and a pseudo shift device;

the pseudo clutch pedal is operated at a time of operation of the pseudo shift device;

a driving mode of the battery electric vehicle includes a three-pedal mode in which an output of the electric motor with respect to operation of an accelerator pedal is changed depending on the operation of the pseudo clutch pedal and the operation of the pseudo shift device;

in the three-pedal mode, the single or plurality of processors is configured to acquire the physical fatigue degree, and to actuate the massage apparatus when the actuation condition is satisfied;

the sensor includes a clutch position sensor configured to detect the operation of the pseudo clutch pedal;

the single or plurality of processors is configured to acquire the physical fatigue degree, based on at least one of the number of times of the operation of the pseudo clutch pedal in a certain time and an operation time of the pseudo clutch pedal in the certain time; and the massage apparatus includes a bearing-surface massage apparatus that is embedded in a bearing-surface seat of the driver's seat at a location corresponding to the particular location on the driver's body when the driver is seated in the driver's seat.

2. The vehicle control system according to claim 1, wherein the actuation condition further includes a condition that the driver permits the actuation of the massage apparatus.

3. The vehicle control system according to claim 1, wherein the actuation condition further includes a condition that a speed of the vehicle is lower than a predetermined speed.

4. The vehicle control system according to claim 1, wherein:

the sensor includes a muscle hardness meter that is installed at the driver's seat; and the single or plurality of processors is configured to acquire the physical fatigue degree, based on a muscle hardness of the driver that is detected by the muscle hardness meter.

5. The vehicle control system according to claim 1, wherein the vehicle is a manual transmission vehicle that includes a clutch pedal.

6. The vehicle control system according to claim 5, wherein:

the sensor includes a clutch position sensor that detects operation of the clutch pedal; and the single or plurality of processors is configured to acquire the physical fatigue degree, based on at least one of the number of times of the operation of the clutch pedal in a certain time and an operation time of the clutch pedal in the certain time.

7. The vehicle control system according to claim 1, wherein the bearing-surface massage apparatus is positioned at locations corresponding to the left thigh of the driver, and is configured to ease fatigue in the left thigh.

8. The vehicle control system according to claim 1, wherein the bearing-surface massage apparatus is positioned at locations corresponding to at least one of the shoulders or waist of the driver, and is configured to ease fatigue in the at least one of the shoulders or waist of the driver.

9. A vehicle control system configured to control a vehicle, the vehicle control system comprising a single or plurality of processors, wherein:

the single or plurality of processors is configured to acquire a physical fatigue degree of a driver of the vehicle, using a sensor that is equipped in the vehicle, wherein the acquired physical fatigue degree is based at least in part on a characteristic of a muscle at a particular location on the driver's body;

the single or plurality of processors is configured to actuate a massage apparatus when an actuation condition is satisfied, the massage apparatus being installed at a driver's seat of the vehicle embedded in a bearing-surface seat of the driver's seat at a location corresponding to the particular location on the driver's body when the driver is seated in the driver's seat, the actuation condition including at least a condition that the physical fatigue degree exceeds a first threshold;

the vehicle is a battery electric vehicle configured to use an electric motor as a dynamic power device for traveling, and includes a pseudo clutch pedal and a pseudo shift device;

the pseudo clutch pedal is operated at a time of operation of the pseudo shift device;

a driving mode of the battery electric vehicle includes a three-pedal mode in which an output of the electric motor with respect to operation of an accelerator pedal is changed depending on the operation of the pseudo clutch pedal and the operation of the pseudo shift device;

in the three-pedal mode, the single or plurality of processors is configured to acquire the physical fatigue degree, and to actuate the massage apparatus when the actuation condition is satisfied;

the driving mode of the battery electric vehicle further includes a two-pedal mode in which the operation of the pseudo clutch pedal is not necessary;

the single or plurality of processors is further configured to switch the driving mode from the three-pedal mode to the two-pedal mode, when a mode switching condition is satisfied, the mode switching condition including at least a condition that the physical fatigue degree exceeds a second threshold during the three-pedal mode; and the single or plurality of processors is configured to determine whether the mode switching condition is satisfied, after the actuation condition is satisfied and the massage apparatus is actuated.

10. The vehicle control system according to claim 9, wherein the bearing-surface massage apparatus is positioned at locations corresponding to the left thigh of the driver, and is configured to ease fatigue in the left thigh.

11. A vehicle control system configured to control a battery electric vehicle that uses an electric motor as a dynamic power device for traveling, the vehicle control system comprising a single or plurality of processors, wherein:

the battery electric vehicle includes a pseudo clutch pedal and a pseudo shift device;

the pseudo clutch pedal is operated at a time of operation of the pseudo shift device;

a driving mode of the battery electric vehicle includes a three-pedal mode in which an output of the electric motor with respect to operation of an accelerator pedal is changed depending on the operation of the pseudo clutch pedal and the operation of the pseudo shift device, and a two-pedal mode in which the operation of the pseudo clutch pedal is not necessary;

the single or plurality of processors is configured to acquire a physical fatigue degree of a driver of the battery electric vehicle, using a sensor that is equipped in the battery electric vehicle, wherein the acquired physical fatigue degree is based at least in part on a characteristic of a muscle at a particular location on the driver's body;

the single or plurality of processors is configured to actuate a massage apparatus when an actuation condition is satisfied, the massage apparatus being installed at a driver's seat of the vehicle, embedded in a bearing-surface seat of the driver's seat at a location corresponding to the particular location on the driver's body when the driver is seated in the driver's seat, the actuation condition including at least a condition that the physical fatigue degree exceeds a first threshold;

the sensor includes a clutch position sensor configured to detect the operation of the pseudo clutch pedal;

the single or plurality of processors is configured to acquire the physical fatigue degree of the driver based on at least one of the number of times of the operation of the pseudo clutch pedal in a certain time and an operation time of the pseudo clutch pedal in the certain time; and the single or plurality of processors is configured to switch the driving mode from the three-pedal mode to the two-pedal mode, when a mode switching condition is satisfied, the mode switching condition including at least a condition that the physical fatigue degree exceeds the first threshold during the three-pedal mode.

12. The vehicle control system according to claim 11, wherein the bearing-surface massage apparatus is positioned at locations corresponding to the left thigh of the driver, and is configured to ease fatigue in the left thigh.

13. The vehicle control system according to claim 11, wherein the bearing-surface massage apparatus is positioned at locations corresponding to at least one of the shoulders or waist of the driver, and is configured to ease fatigue in the at least one of the shoulders or waist of the driver.

* * * * *